Oct. 18, 1966  R. EGGEBRECHT ETAL  3,279,693
FOUR-SPECIES CALCULATING MACHINE
Filed Aug. 17, 1964  10 Sheets-Sheet 1

INVENTORS
RUDOLF EGGEBRECHT
ANDREAS METSCHNABEL

INVENTORS
RUDOLF EGGEBRECHT
ANDREAS METSCHNABEL

Oct. 18, 1966  R. EGGEBRECHT ETAL  3,279,693
FOUR-SPECIES CALCULATING MACHINE
Filed Aug. 17, 1964  10 Sheets-Sheet 8

INVENTORS
RUDOLF EGGEBRECHT
ANDREAS METSCHNABEL

INVENTORS
RUDOLF EGGEBRECHT
ANDREAS METSCHNABEL

United States Patent Office 3,279,693
Patented Oct. 18, 1966

3,279,693
FOUR-SPECIES CALCULATING MACHINE
Rudolf Eggebrecht, Rothenbach, near St. Wolfgang, and Andreas Metschnabel, Nurnberg, Germany, assignors to Diehl, Nurnberg, Germany
Filed Aug. 17, 1964, Ser. No. 389,940
Claims priority, application Germany, Aug. 16, 1963, D 42,251
35 Claims. (Cl. 235—60)

The present invention relates to a motor driven four-species calculating machine provided with a counter or register carriage driven by spring force and a device for pre-adjusting a fixed decimal point. Motor driven four-species calculating machines are known for carrying out fast and fully automatically multiplication and division operations. Calculating machines of this type are provided with a stationary register and a counter or register carriage displaceable in decades relative to said stationary register for division and multiplication operations, with a main counter with a high number of digits for receiving the dividend or the product, and with a revolutions counter with a small number of digits for receiving the quotient or the multiplier.

When carrying out a division, first the dividend is put into the main counter in the carriage and the divisor is put into the stationary register. Subsequently, the counter or register carriage is displaced from its left basic position toward the right to such an extent that the highest occupied digit of the main counter and the stationary register are in alignment, whereupon the actual calculating process consisting of subtractions and additions, starts. During this calculating process, the counter or register carriage is moved back into its left basic position in which position also the output of the result (the quotient) is effected.

When carrying out a multiplication, the multiplicand is put into the stationary register and the multiplier is put into the revolutions counter and, more specifically, in the basic position of the register carriage. The multiplication operation is subsequently effected in such a way that the multiplicand stored in the stationary register is, starting with the unit of the multiplier stepwise, multiplied and the result is fed into the main counter of the register carriage. During this operation, the counter or register carriage moves from its basic position toward the right while it returns into its basic left position for the output of the result after the multiplication has been completed.

If a four-species calculating machine operating in the above-described manner is provided with a device for printing or only indicating a pre-adjustable fixed point, for carrying out a division, it is merely necessary to move the register carriage into the preselected position of the decimal point prior to the input of the dividend into the main counter and to hold the same in this position until the input of the dividend has been completed. The output of the calculated quotient is effected after the register carriage has returned to its left basic position with the decimal point always at the proper place. In this basic position, the remainder left in the main counter is indicated, or printed, while the decimal point is not indicated inasmuch as it would not be in the proper place.

When carrying out a multiplication with decimals, the input of the multiplicand into the stationary register of the multiplier into the revolutions counter is effected in the left basic position of the register carriage and thus always with the decimal in the proper place. In this instance, it is, therefore, merely necessary, in order to receive the product from the main counter with the decimal point at the proper place, to hold the register carriage, prior to its return into the left basic position, in the preselected position of the decimal point until the product has been calculated or the same has been printed.

It is, of course, to be understood that with the above-described four-species calculating machine, it is also possible to carry out additions and subtractions. In a very simple manner, these calculating operations are carried out by stationary balance counters while the stationary register and the register carriage are inoperative. The output or the printing of the sums or differences calculated by the machine are, therefore, always so calculated that the decimal point is at the proper place.

It is, therefore, an object of the present invention to provide a four-species calculating machine with preadjustable decimal point in which, when carrying out a division, the input of the dividend, and when carrying out a multiplication, the output of the product, is effected in a position of the register carriage corresponding to the position of the preadjusted decimal point.

It is a further object of the present invention to provide a four-species calculating machine in which, after the input or recall of the dividend, divisor or the two factors into the calculating machine and after actuating the division key or multiplication key and result key, the dividing process and also the multiplication operation are effected fully automatically.

It is a still further object of the present invention to provide a four-species calculating machine as set forth in the preceding paragraph, in which, when carrying out a division, the output of the quotient is always effected with the decimal point in the proper place while the remainder left in the main counter is put out or printed, without a decimal point.

A still further object of the present invention consists in the provision of a four-species calculating machine in which when carrying out a multiplication, the register or counter carriage is brought into its basic position after the product has been put out in order to be ready for a further calculating operation.

It is another object of the present invention to provide a four-species calculating machine in which calculations with numbers having no decimal point can be effected.

It is still another object of the present invention to provide a four-species calculating machine as set forth in the preceding paragraphs, with which divisions with greatest possible quotient without decimal point may be carried out.

These and other objects and advantages of the invention will appear more clearly from the following specification in connection with the accompanying drawings, in which:

FIGURE 1 is a perspective view of a four-species calculating machine according to the present invention;

FIGURE 2 diagrammatically illustrates the calculating machine of FIGURE 1 provided with the device according to the present invention and the structural elements cooperating therewith;

FIGURE 3 diagrammatically illustrates a portion of the four-species calculating machine according to the present invention;

Figure 1:
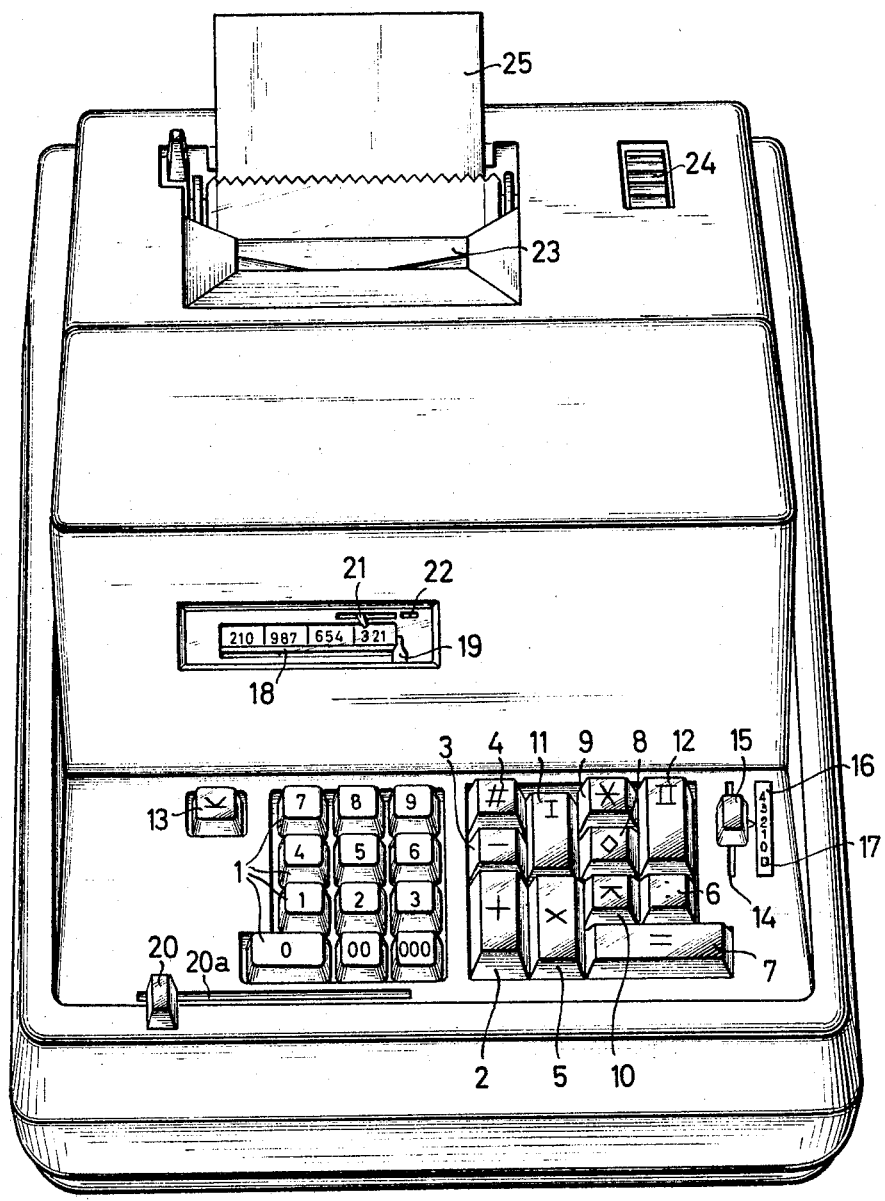

The calculating machine according to the present invention is characterized primarily in that a decimal point abutment shaft, hereinafter called decimal shaft, is provided which is held in a center position by resilient means and which is displaceable from said center position in both directions toward abutments while simultaneously tensioning said resilient means. The decimal shaft is furthermore provided with abutment pins arranged adjacent in the manner of a helix around said shaft, while said pins are spaced from each other angularly by an angle $\alpha$ and axially spaced from each other by a distance corresponding to the spacing of the digits in the calculating device of the machine, said abutment pins being adapted selectively to be adjusted by hand-operable selector means so as to extend into the range of movement of a dog provided at the counter or register carriage.

The calculating machine is furthermore characterized in that a control linkage for the decimal shaft is provided which initiates the input of the dividend in the calculating machine when the abutment of the counter or register carriage moves toward the right and engages one of said abutment pins, and initiates the output of the product when said abutment on said counter or register carriage moves toward the left and engages one of said abutment pins. In addition thereto, machine-controlled devices are provided which are adapted to turn the decimal shaft at intervals by about half the angle between the abutment pins, so that the dog on the counter or register carriage may pass unimpededly in front of or behind the abutment pins, which is necessary for the proper execution of the calculating programs and for the fully automatic return of the register carriage into its basic position.

The decimal shaft suggested in accordance with the present invention is of particular advantage when the displacement of the counter or register carriage is effected by spring force. In this way, it is possible to save a motor for the drive of the carriage, a single-revolution coupling, and a reversing device. According to a feature of the present invention, two springs of equal strength and adapted to be tensioned in one and the same direction are employed for the drive of the carriage in the calculating machine according to the present invention, while first one of the springs moves the carriage from the basic position toward the right and after actuation of a reversing device, the second spring moves the carriage toward the left back into its basic position. The tensioning of the springs for the drive of the carriage may be effected directly or indirectly and by the drive motor of the calculating machine.

The decimal shaft adjustable by preselector means is furthermore particularly advantageous when according to a further feature of the present invention, the calculating machine is provided with a program control device for fully automatically carrying out divisions and multiplications, which program control device is adapted to be made effective by the function keys for the multiplication, the division, and the output of the result. More specifically, the calculating machine according to the present invention may be provided with a program control device in which the main machine shaft just prior to completion of its revolution actuates in a stepwise manner a program control shaft, for both the division and multiplication operations. The abovementioned program control shaft is adapted to displace at intervals the decimal shaft into an ineffective position in order not to interfere with the calculating process, by means of suitable link systems, so that the dog provided at the register carriage can unimpededly pass in front of or behind the abutment pins of the decimal shaft.

*General arrangement*

The four-species calculating machine described herein is, in addition to the devices mentioned above, provided with an input mechanism comprising a ten keyboard and a pin carriage, and is furthermore provided with a printing mechanism for registering all numbers and symbols involved in the calculating operation. The calculating machine is driven by an electric motor adapted to be turned on by a function control keyboard. The electric motor drives the shaft of the stationary register (counter shaft) through the intervention of a transmission and a single revolution coupling known per se. The electric motor furthermore drives the main shaft of the machine through the intervention of a further single revolution coupling and which main shaft, in connection with the program control mechanism, and through the intervention of racks movable back and forth within the calculating machine, effects the working steps within the machine as, for instance, input and output of the numbers, return of the pin carriage, etc., and which main shaft also effects the tensioning of the springs for the drive of the counter or register carriage. The springs for driving the register carriage are, therefore, always tensioned at the latest when the carriage, after execution of a multiplication or division, has moved from its basic position toward the right and back to the left, or has almost completed its back-and-forth movement.

It may furthermore be mentioned that with the machine selected for the description of the present invention, the division calculating process is such that after input of the dividend into the main counter and after input of the divisor into the stationary counter or register, the register carriage first moves into its right-hand reversing position and after reversing, moves back until the highest digit of the dividend in the main counter and the highest digit of the divisor in the stationary register are in alignment with each other whereupon the actual division operation is initiated. The calculating mechanism is in operation until the register carriage has moved back into its left basic position and has been arrested by a catch. The calculating machine is turned off only after the remainder has been printed without the decimal point and after the quotient has been printed.

The multiplying process of the calculating machine is, after the input of the multiplier, effected in such a way that the register carriage is in a stepwise manner moved from its basic position toward the right until it is reversed in its right-hand end position and abuts the decimal shaft for the output of the product. The return of the register carriage after the product has been printed is likewise effected automatically by the calculating machine.

Referring now to the drawing in detail and FIG. 1 thereof in particular, the calculating machine shown therein has its front side provided with a numeral keyboard 1 with keys marked with the reference numerals 1 to 9 and with three keys for the input of zeros and marked with the symbols 0, 00 and 000. To the right of this numeral keyboard 1 there is provided a function control keyboard comprising an addition key 2, a subtraction key 3, a non-calculating or printing key 4, a multiplication key 5, a division key 6, a resultant key 7, a subtotal key 8, a total key 9, and a constant calling or repeat key 10, with each of the keys being provided with a symbol corresponding to its function. For the purposes of calling two storage mechanisms provided in the calculating machine, there are furthermore provided two storage mechanism keys 11 and 12 marked I and II.

To the left of the numeral keyboard 1 there is provided a constant setting key 13.

To the right of the function control keyboard there is provided a decimal point adjusting knob 15 displaceable along a slot 14 and provided with a pointer. Knob 15 is connected to a slide (not shown in FIG. 1 and described later) for preselecting the decimal point. A scale 16 provided with numerals 0 to 4 is located to the right of knob 15. Scale 16 serves for indicating the number of decimals after the decimal point. A mark 17 at the end of the scale 16 serves for adjusting the decimal shaft in such a way that a division may be effected with largest possible quotient while no printing of a decimal point occurs.

Above the numeral keyboard 1 there is provided a further scale 18 on which the number of digits or places occupied in the pin carriage is indicated by a pointer 19 connected to the pin carriage. A knob 20 displaceable toward the right within a slot 20a is provided for purposes of clearing the values put into the pin carriage. The slide for the preselection of the decimal point and connected to the knob 15 is connected to a decimal point indicator 21 provided above the scale 18, so that a person using the calculating machine can see the position of the preadjusted decimal point also on scale 18. A mark 22 arranged to the right and above scale 18 corresponds to the mark 17 at the lower end of scale 17. A linkage system connected to the knob 15 leads to the printing mechanism 23 only diagrammatically indicated in FIG. 1, which printing mechanism 23 frees, in the preselected position of the decimal point, a decimal point key for printing, as will be described further below. A handwheel 24 protrudes beyond an opening in the right-hand upper corner of the machine housing and serves for the manual movement of a roll of tape 25 to be printed by the printing mechanism of the machine and leaving the calculating machine toward the top as viewed in FIG. 1.

Figure 2:
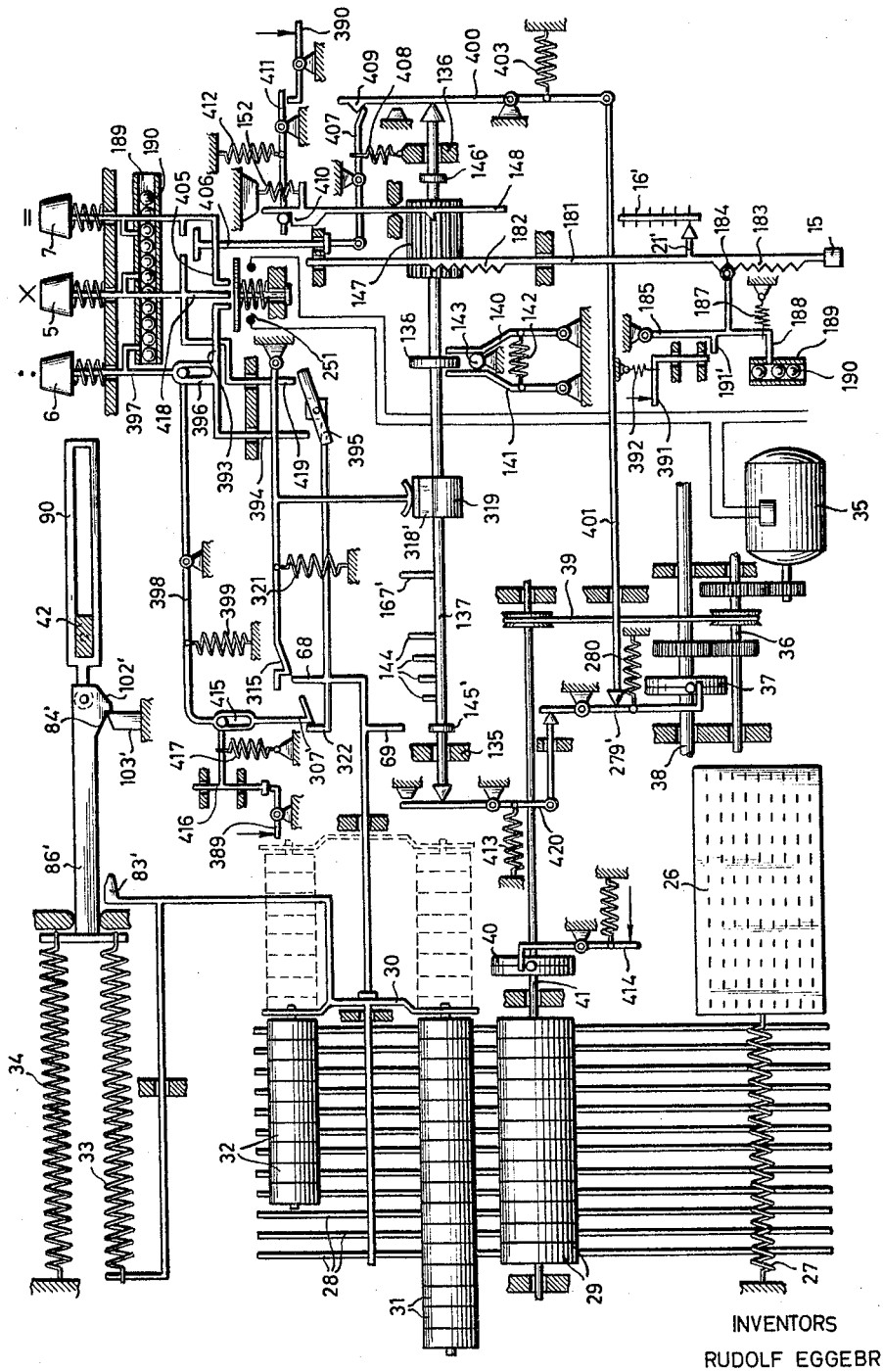

As will be evident from the diagrammatic showing of FIG. 2, the calculating machine is provided with a pin carriage 26 operable by the numeral keyboard through the intervention of a stepping mechanism. This pin carriage 26 may be displaced toward the left through the intervention of a spring 27 into the range of racks 28 by one place when actuating the 0 key, by two places when actuating the 00 key, and by three places when actuating the 000 key. In a manner known per se, the racks 28 moving toward the rear under the influence of a spring and held by a tensioning or guiding rod or bar in their basic position, sense when the tensioning rod or bar moves backward, the values put into the pin carriage 26 during a revolution of a main machine shaft 38 and transfer the same either into a machine stationary register 29 or into a main counter 31 provided on a counter or register carriage 30 movable in transverse direction or into a revolution counter 32 likewise provided on the register carriage 30 or into one of the storage mechanisms I or II made effective by the keys 11 or 12, respectively.

As will be described further below in connection with the description of FIG. 4, two springs 33 and 34 serve for driving the register carriage 30. Springs 33 and 34 become effective one after another. While spring 33 moves the register carriage 30 from its left-hand basic position toward the right, the spring 34 moves the carriage toward the left into the basic position after it has been reversed. Carriage 30, provided with the counters 31 and 32, is shown in FIG. 2 in solid lines in its left basic position, and in dashed lines in its outermost right-hand reversing position.

Figure 3:
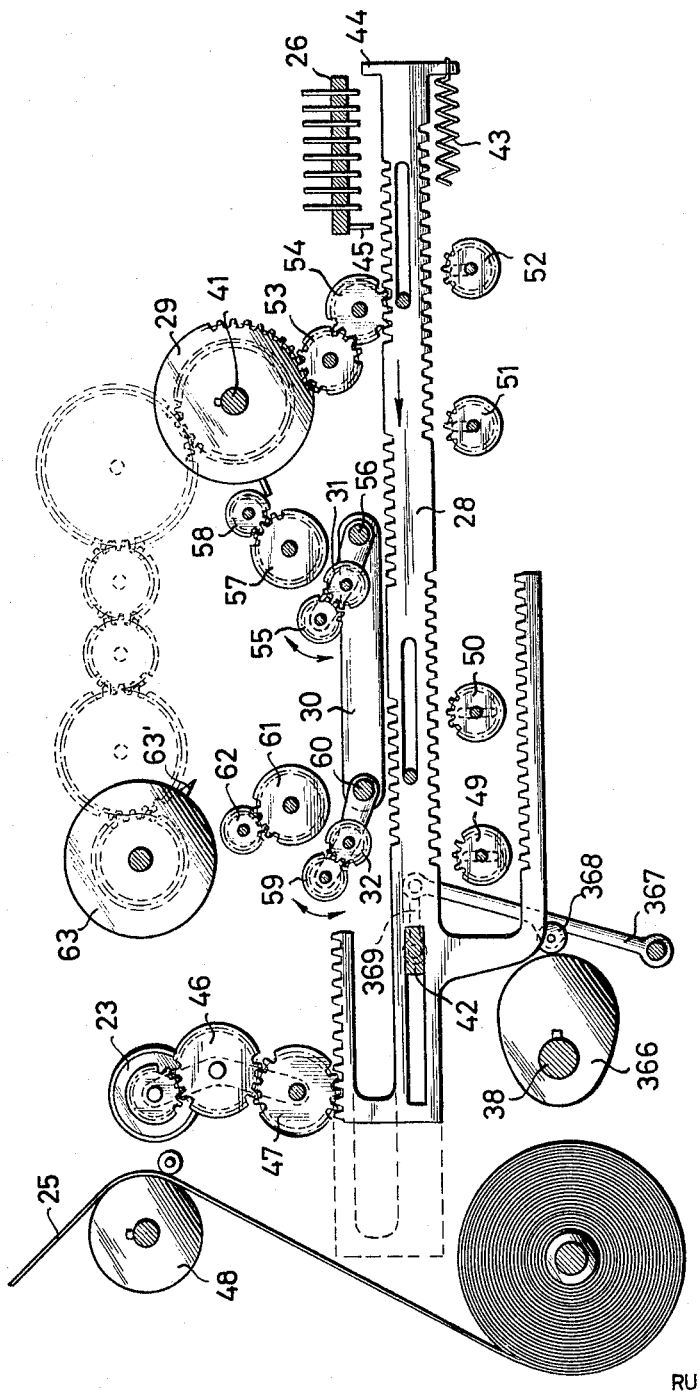

An electric motor 35 serves for driving the calculating machine. The electric motor 35 drives through the intervention of a transmission shaft 36 and a single revolution coupling 37 known per se a main machine shaft 38 and furthermore through the intervention of a belt drive 39 and a second single revolution coupling 40, a counter shaft 41. The main machine shaft 38 serves, in a manner known per se, for driving a tensioning bar or rod 42 through the intervention of a cam 366 (FIG. 3). Tensioning bar 42 serves for driving the springs 33 and 34 of the carriage drive.

For the sake of completeness, it may be mentioned that FIG. 2 also shows a decimal point shaft 137 according to the present invention, and a linkage system cooperating therewith. A detailed description of the embodiment shown in FIG. 2 will be furnished further below.

Referring now to FIG. 3, this figure diagrammatically illustrates the devices necessary for the input and output of the numbers and for the proper execution of the calculating operations within the machine, however, without the control linkage systems pertaining thereto. As has been brought out already above, during a revolution of the main machine shaft 38, the tensioning rod 42 is moved toward the rear (with regard to FIG. 3 toward the left), through the intervention of a cam 366, a roller 368 arranged on a lever 367 journalled in the machine frame, the lever 367 and a rod 369, so that the racks 28 are likewise moved toward the rear in view of the tensioning of a spring 43 engaging each rack. In order to be able to transfer the numerical values put into the pin carriage 26, the racks 28 have their front ends provided with one abutment 44 each by means of which they rest against the respective adjusted pin 45 of the pin carriage 26. The wheels of the printing mechanism 23 are in driving connection with the racks 28 through the intervention of transmission gears 46, 47 so that the values received from the racks 28 may be printed onto the roll of tape 25 transported in a stepwise manner over the roller 48. In the embodiment of the calculating machine described herein, only the first four wheels of the printing mechanism 23 are provided with a decimal point key which is normally held stationary and is released for the printing operation selectively by means of an adjusting linkage connected with the adjusting knob 15 (see FIGS. 1 and 2).

The reference numerals 49 and 50 designate two balance counters A and B adapted to be moved upwardly or downwardly into the path of the ranks 28 which may be actuated selectively by means of the keys 11 and 12 for adding and subtracting calculating operations. FIG. 3 furthermore shows an auxiliary storage member 51 adapted to be called when pressing down the constant calling key 10 and adapted to be made effective by the constant setting key 13. Finally, there is provided a second auxiliary storage member 52 which is automatically coupled to the racks 28 prior to the backward movement of the same.

The stationary register 29 which consists, for instance in the calculating machine according to the present invention of pin wheels, may be coupled selectively to the racks 28 through the intervention of laterally displaceable gears 53 and 54. The main counter or register 31 provided on the displaceable register carriage 30 is arranged at a frame 55 so as to be tiltable upwardly and downwardly about a round guiding means 56 which simultaneously serves for guiding the carriage 30. For the input and output of numerical values, the main counter 31 is tilted downwardly, and for coupling the same to stationary register 29, the main counter 31 is tilted upwardly so as to mesh with the machine stationary transmitting gears 57 and 58. In the same manner, the revolutions counter 32 is tiltable upwardly and downwardly in a frame 59 about a round guiding means 60 which also serves simultaneously for guiding the carriage 30. For the input and output of numerical values, also this counter is tilted downwardly so as to mesh with the corresponding teeth of the racks 28, and during the calculating operation the revolutions counter 32 is tilted upwardly so as to mesh with the machine stationary gears 61. The drive of the revolutions counter 32 is effected through a transmission gear train which is drivingly connected to the counter or calculating shaft 41 (see dot-dash lines in FIG. 3) through the intervention of an actuator tooth 63' provided at the gear 63 and adapted to act upon the transmitting gears 62.

Drive for the register carriage

Figure 4:
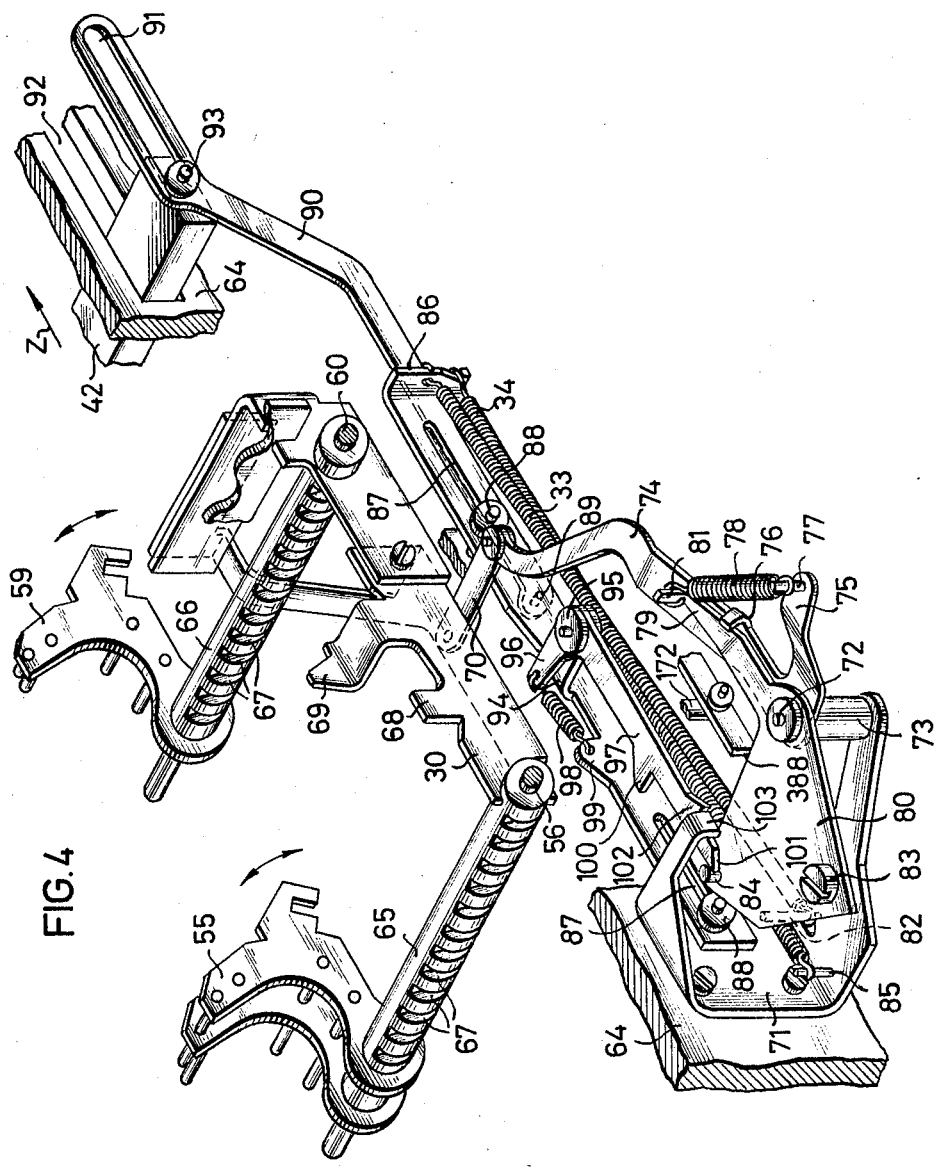
FIGURE 4 is a perspective view of the drive of the counter or register carriage according to the present invention.

FIG. 4 shows the right-hand portion of the register carriage 30 together with the drive therefor, as well as the arrangement for tensioning the drive springs 33, 34. The drive springs 33, 34 are arranged approximately horizontally and parallel to an intermediate wall 64 of the calculating machine. Thus, the transmission of movement onto the carriage has to be effected by means of reversing levers. FIG. 4 furthermore shows the round guiding means 56 and 60 for journalling and guiding the carriage as well as the frames 55 and 59 of the two-counter mechanism 31 and 32 provided on the register carriage, which frames are tiltable about said round guiding means 56 and 60 (see also FIG. 3). Guiding sleeves 65 and 66 of the carriage are provided with grooves 67 adapted to receive a latch (not shown in FIG. 4) during the calculating process by means of which the carriage 30 may be arrested with regard to the stationary register 29 or the gears driven by the counter or calculating shaft 41. The righthand wall of the register carriage 30 (with regard to the drawing) is provided with an abutment 68 for engagement with a lock for arresting the carriage in the basic position (not shown in FIG. 4 but described in connection with FIGS. 6 and 7), with a dog 69 and with a link 70 forming a part of the drive for the carriage, as will be evident from the following description.

A U-shaped bearing bracket 71 is connected to the intermediate wall 64 of the calculating machine and is provided with a bearing stud 72. A sleeve 73 is rotatable about stud 72. Sleeve 73 has its upper end fixedly connected with a first angle lever 74, 75. The longer arm 74 of angle lever 74, 75 has one end thereof hinged to the link 70 connected to the register carriage 30. Through the intervention of this link 70, the tilting movement carried out by the angle lever 74, 75 is transformed into a reciprocatory movement of the carriage 30. The shorter arm 75 of the angle lever 74, 75 is provided with a bolt 77 having connected thereto a strong tension spring 78.

On top of said first angle lever 74, 75 there is provided a second angle lever 79, 80 tiltable about the same stud 72. Arm 79 of said second angle lever 79, 80 is provided with a bent-off extension 81 to which the other end of the abovementioned tension spring 78 is connected. Thus, the tension spring 78 constantly holds the second angle lever 79, 80 against an abutment 76 provided at the lever arm 74 of the first angle lever 74, 75. The other arm 80 of the second angle lever 79, 80 has its bottom side provided with a pin 82 to which there is connected the lefthand end (with regard to the drawing) of the first tension spring 33 serving for the rightward movement of the carriage 30. The lever arm 80 of the second angle lever 79, 80 has its top side provided with a screwhead 83 serving an abutment and with an abutment bolt 84, for a purpose to be described further below.

A pin 85 is located on the inside of the lower leg of the bearing bracket 71. The left-hand end (with regard to the drawing) of a second tensioning spring 34 serving for the leftward movement of the register carriage 30, is connected to pin 85. The righthand ends of both tension springs 33, 34 for the rightward and leftward movement of the carriage, respectively, are connected to eyelets provided in the bent-off end of a tension slide member 86 which is displaceably journalled at the right-hand side of the intermediate wall 64 by means of oblong holes 87 and bolts 88.

The rear side of said tensioning slide 86 is provided with a bolt 89 to which a coupling-rod 90 is hinged the rearward, cranked end of which is provided with an oblong hole 91. The oblong holes 87 provided in the slide 86 limit the path of movement of the two springs 33 and 34 in both directions. The length of the oblong hole 91 is designed in conformity with the stroke of tensioning rod 42 one end of which extends through the opening 92 in the intermediate wall 64 of the calculating machine. A bolt 93 provided on tensioning rod 42 is slidably arranged within hole 91. As will be evident from FIG. 4, a backward movement of the tensioning rod 42 in the direction of the arrow Z brings about a common tensioning of the two drive springs 33, 34 through the intervention of the coupling rod 90 and the slide 86.

In order to make the two approximately equally dimensioned drive springs 33 and 34 successively effective for the rightward and leftward transport of the carriage 30, furthermore the following device is provided: A supporting arm 94 connected to slide 86 and extending toward the right approximately from the middle of slide 86 carries a bolt 95 tiltably supporting a further angle lever 96, 97. The shorter arm 96 of said angle lever 96, 97 is provided with an eyelet engaged by a relatively weak tension spring 98 the other end of which is held in an eyelet 99 of the tensioning slide 86. The other arm 97 of said angle lever 96, 97 and protruding toward the front (with regard to the drawing) is provided with an abutment edge 100 and with an inclined edge 101. Furthermore, the lever arm 97 is provided with a short arresting edge 102.

In the tensioned condition of the drive springs 33, 34 (shown in FIG. 4), the short arresting edge 102 rests against the abutment 103 at the bearing bracket 71 due to the force of the spring 98. In this way, the tensioning slide 86 is arrested in its right-hand end position and the drive spring 34 has no effect on the carriage. In the position shown in FIG. 4, therefore, when the spring 33 is effective it attempts to turn the angle lever 79, 80 and thereby through the intervention of the abutment 76, also the angle lever 74, 75 in clockwise direction. Thus, the drive spring 33 moves the register carriage 30 toward the right.

Toward the end of this rightward movement, the screwhead 83 abuts against the inclined edge 101 of the lever arm 97 and thereby renders ineffective the engagement between the edge 102 and the abutment 103 while the bolt 84 rests against abutting edge 100 on the lever arm 97. In this way, the spring 33 has no effect on the carriage and the spring 34 now moves the tensioning slide 86 toward the left (with regard to FIG. 4) whereby the register carriage 30 is moved toward the left through the intervention of the angle lever 79, 80, the spring 78, the angle lever 74, 75, and the link 70. The register carriage 30 thus is brought back into its basic position by means of the drive spring 34, and arrested in this position. After the tensioning rod 42 has been brought back into its tensioning position, the drive for the carriage again becomes fully effective.

As will be explained in detail further below, during the output of the product, the tensioning of the two drive springs 33 and 34 is effected in the left-hand basic position of the register carriage only when calculations with numbers having no decimal points (whole numbers) are involved. When multiplying decimal numbers, however, the output of the product is effected prior to the register carriage reaching its left-hand basic position. Inasmuch as also in this instance, the two drive springs 33, 34 are tensioned, after tensioning of the drive springs 33, 34 the spring would again become effective and would move the register carriage toward the right. In order to prevent this, a link 388 actuated by the machine main shaft 38 is provided in the calculating machine. Linkage 388 tensions the spring 78, which is considerably stronger than the spring 33, through the intervention of the angle lever 79, 80 while the angle lever 74, 75 is held by the carriage 30 still arrested in the position of the decimal point. If subsequently, after the output of the product with the decimal point, the register carriage is released, spring 78 through the intervention of the angle lever 74, 75 and the link 70 moves the register carriage back into its basic left-hand position where it is arrested.

Control device for the automatic division and multiplication operations

As has been mentioned above, the calculating machine according to the present invention is provided with a program control device which may be actuated by the multiplication key 5, the division key 6, and the result key 7, which program control device comprises a program control shaft common for both operations, the division and the multiplication. For carrying out a division, therefore, it is merely necessary to key the dividend into the machine, to actuate the division key, subsequently to key the divisor into the calculating machine, and finally to actuate the result key. After the calculating process has been completed, the printing of the remainder and the printing of the quotient is effected in the left-hand basic position of the register carriage, whereupon the machine stops automatically.

A multiplication process is effected in an analogous manner. After the input of the multiplicand, actuation of the multiplication key, input of the multiplier and actuation of the result key, the printing of the result is effected following the calculating process whereupon the machine stops automatically.

If the calculating machine is provided with a device for presetting a decimal point and an adjustable decimal shaft on one hand and with a spring drive for the register carriage on the other hand, the decimal shaft has to be moved into an ineffective position in order to be able to unimpededly carry out division and for returning the register carriage into its basic position after the calculation has been completed. Furthermore, during the last machine operation, the decimal shaft has to be brought back into its effective position. When carrying out a multiplication operation, the decimal shaft likewise has to be brought into an ineffective position after the input of the multiplicand and multiplier during the subsequent calculation process proper. Only after completion of the calculating operation does the decimal shaft have to be moved into the path of the carriage returning into its basic position in order to obtain the output of the product with the decimal point in the proper place. These control operations may be prepared in a very simple manner by the program control device according to the present invention or, more specifically, by the common program shaft, and may be carried out by the main machine shaft just prior to completion of its rotation.

Figure 5:
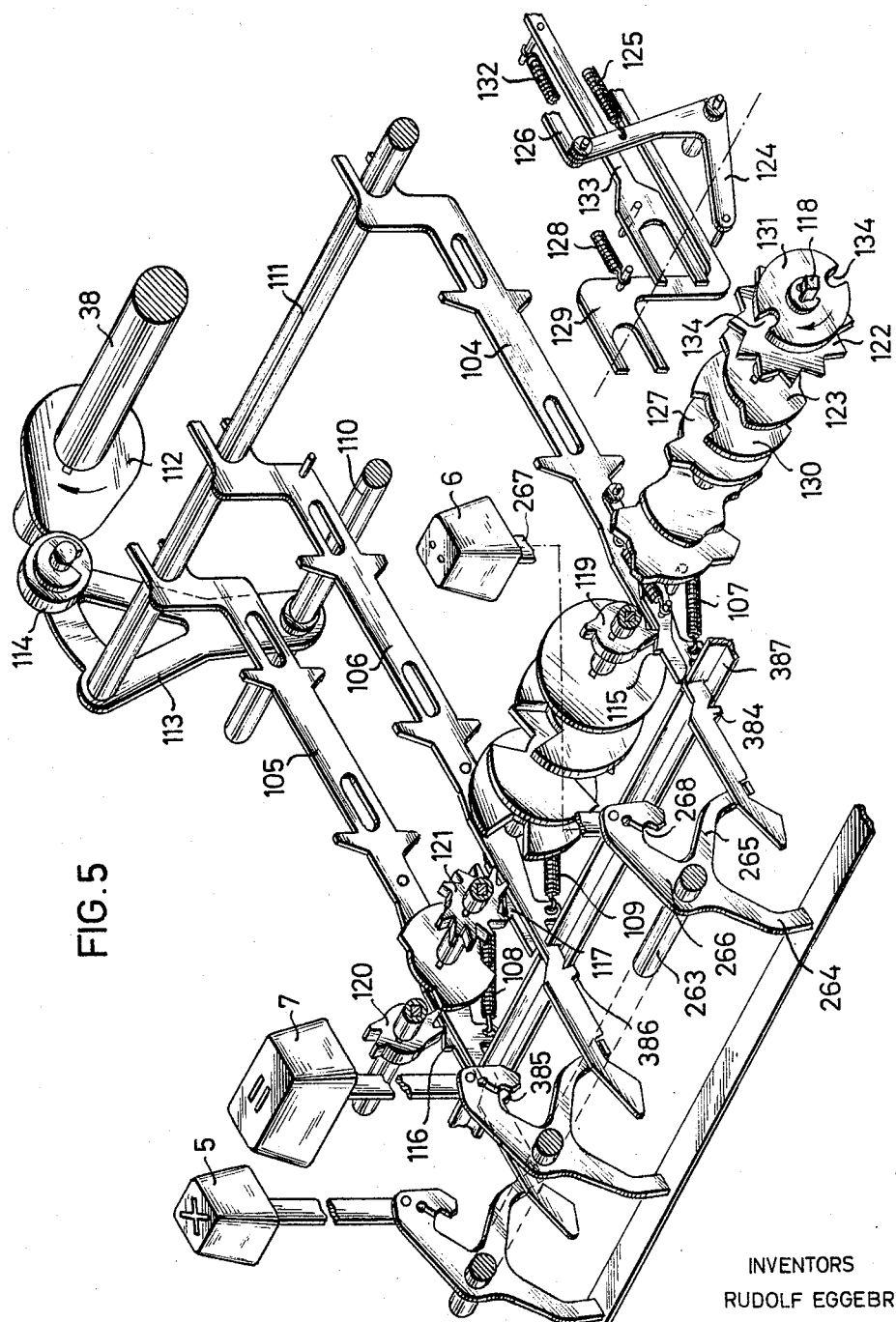
FIGURE 5 is an isometric view of the program control device provided in the calculating machine according to the present invention.

Referring now to FIG. 5, this figure illustrates in principle the design and operation of the program control device according to the present invention. Basically, this device is a stepping mechanism adapted to be actuated by a plurality of control slides. A common program control shaft completes one revolution after twelve steps, with a full working cycle being completed after six steps. Each of the three function control keys, viz. the division key 6, the multiplication key 5, and the result key 7 has associated therewith a slide 104, 105 and 106 respectively effective with the actuation of these keys 5, 6 and 7. In the basic or ineffective position of the control shaft, said slides 104, 105, 106 rest with a nose 384, 385, 386 against a machine stationary abutment 387 under bias of a spring 107, 108, 109 respectively. Following actuation of one of the functional control keys, the slides 104, 105, 106 are held against a rod 111 tiltable about a shaft 110 which rod 111 during one revolution of the main machine shaft 38 and through the intervention of a cam 112 and a roller 114 provided on a lever 113 carries out a reciprocatory movement which is transferred to the respective actuated slide 104, 105, or 106.

Each of the slides 104 to 106 is provided with a spring-loaded abutment 115, 116, 117. A program control shaft 118 designed as a profile shaft is provided with pinions 119, 120, 121 located above said abutments 115 to 117. During a backward stroke of the slides 104 to 106, the abutments 115 to 117 slide below the teeth of the corresponding pinion whereas during a forward stroke the abutments 115 to 117 engage the teeth of said pinions just prior to the completion of the rotation of the main machine shaft 38. A 12-tooth step wheel 112 provided on program control shaft 118 serves in connection with an arresting member (not shown) for exactly positioning the program shaft 118 and for preventing a rotation of the same beyond the proper angle. The stroke of rod 111 is so dimensioned that with one step, the pinions 119 to 121 respectively carry out at the most two steps.

As will be evident from FIG. 5, the pinion 119 actuated by the division key 6 and the slide 104 pertaining thereto is provided with one tooth only for each stopping rhythm, which tooth is, in the basic or ineffective position of the program control shaft 118, so located within the range of movement of the abutment 115 that during the second half of the forward movement of the slide 104, only the edges of the abutment 115 engage said tooth and advance the program shaft 118 by one step only. Subsequently, the slide 104 is arrested in its ineffective position. In contrast thereto, the pinion 120 adapted to be actuated by the multiplication key 5 is provided with two spaced sets of two teeth, which in the basic position of the program shaft 118 shown in FIG. 5 are located within the range of the abutment 116 of slide 105 in such a way that during one rotation of the main machine shaft 38, the program control shaft 118 is advanced right at the start of the forward movement. Thereafter, the slide 105 is likewise arrested in its ineffective position.

As will be furthermore evident from FIG. 5, the control pinion 121 adapted to be actuated by the result key 7 is provided with twice-five teeth which are arranged on the program control shaft 118 in such a way that during an actuation of the result key 7 following the actuation of the division key 6 or the multiplication key 5, the program control shaft 118 is advanced by two steps each through the intervention of the slide 106 and the abutment 117. Only in the last phase, following the previous adjustment of the program control shaft 118 by only one step during the division, is the program shaft 118 at the end advanced by one step only into a basic position offset by 180° due to the fact that one tooth each is missing from the pinion 121.

In view of the above, for the division and multiplication operations, two completely different rhythms are obtained. When the various control positions occupied by the program control shaft during one-half of its revolution are designated with O, I, II, III, IV, V, VI=0, during a division, the program control shaft occupies the control positions O, I, III, V, O, and during a multiplication operation occupies the control positions O, II, IV, O. The control position VI is identical to the control position O for the reason that each tooth on any of the control discs 119 to 123 of control shaft 118 appears twice on the respective cam, and, more specifically offset by 180° so that following half a revolution of the control shaft, which corresponds to control position VI, the control shaft occupies the same position it had in control position O with regard to the respective control rod to be actuated by the respective cam. These two control rhythms thus have the following operations in the machine associated therewith:

During a division operation, with the first revolution of the main machine shaft 38, the program control shaft 118 is brought into control position I while simultaneously the input of the dividend is effected. Together with the movement of the program control shaft 118 into the control position III, the input of the divisor is effected. Together with the adjustment of the program control shaft in control position V, the output of the remainder from the main counter and with the subsequent adjustment of the program control shaft in control position VI=0, the output of the quotient is effected.

When carrying out a multiplication operation, with the adjustment program shaft in the control position II, the input of the multiplicand takes place; with the adjustment of the control shaft in the control position IV, the input of the multiplier is effected, and finally, with the adjustment of the control shaft into the O position, the output of the product is effected.

The general operations of the calculating machine for the division and multiplication operations and controlled or carried out by the program control shaft 118, as well as the operations connected therewith as, for instance the inward and outward tilting movements of the counter mechanisms, the arresting of the function control keys, etc., are not further referred to in the specification. Hereinafter, only those control operations are described which are of importance in connection with the decimal shaft provided in the calculating machine in conformity with the present invention.

The program control shaft 118 is provided with a control disc 123 against which the left arm of an angle lever 124 is held by means of a spring 125, while the right arm of the angle lever 124 is connected to a control rod 126. Control disc 123 is so designed that it displaces the control rod 126 in the control positions III, IV, V of the program control shaft into a position toward the left with regard to FIG. 5. Thus, during the displacement of the program control shaft 118 into the control position III, the control rod 126 is moved toward the left whereupon at the end of the corresponding revolution of the main machine shaft, after the input of the divisor, the decimal shaft is brought into its ineffective position. In this way, the register carriage may, after the input of the divisor, move unimpededly toward the right into the right-hand reversing position and may subsequently move toward the left and return into its basic left-hand position. The same control disc 123 during the input of the multiplier in the control position IV of the program control shaft, the preparation, and at the end of the respective revolution of the main machine shaft also effects the displacement of the decimal shaft 137 into its ineffective position so that multiplication operation can be carried out unimpededly. When switching the program control shaft 118 from its control position V to its control O or from IV to O, the control rod 126 is displaced toward the right by control disc 123, so that the decimal shaft again occupies its basic position.

Further control means have to be provided in order to obtain the output of the product with the decimal point at the proper place. For this purpose, a further control disc 127 is provided on program control shaft 118. A control rod 129 is held against the abovementioned control disc 127. Control disc 127 is so designed that when pressing down the result key 7 after the input of the multiplier in control position IV, the control rod 129 is moved toward the right and thereby in control position IV a slide is brought into the path of the register carriage 30. This brings about that when the register carriage is reversed in its right-hand end position, the switching-off of the decimal shaft which was previously effected by the control disc 123 through the intervention of the control rod 126 up to the control position V, is again made ineffective so that the decimal shaft maintains its ineffective position during the rightward movement of the carriage during the multiplication process while, for the output of the product, however, it again occupies its working position.

A control disc 130 likewise provided on program control shaft 118 serves in cooperation with a control rod 133 and in cooperation with a spring 132 connected thereto for releasing the register carriage from its basic position for the calculation after the input of the divisor or multiplier, respectively, at the end of the rotation of the main machine shaft.

A further control disc 131 provided with recesses 134 serves, as will be described in detail further below, for releasing the adjusting slide provided for the decimal shaft in the basic position of the program control shaft 118 only and for arresting said adjusting slide in all other control positions.

*Device for the proper input of the dividend and output of the product*

The device for the input of the dividend and the output of the product provided in the calculating machine according to the present invention to assure that the decimal point is always in the proper place, will presently be described in connection with FIGS. 6 to 9.

The decimal shaft 137 is rotatably journalled and is displaceably journalled for movement in both directions in side walls 135 and 136 of the calculating machine. A toothed disc 138 is fixedly connected to decimal shaft 137. Furthermore, an angle bracket 139 is connected to the intermediate wall 64 by means of screws. Two levers 140, 141 acting in the manner of pincers are tiltably journalled on angle bracket 139 while the rounded heads of said levers 140, 141 rest against the end faces of disc 138. The two levers 140, 141 are held in engagement with a stud 143 provided on angle bracket 139 and also in engagement with the end faces of the disc 138 by means of a spring 142 interconnecting said two levers 140, 141. As will be evident from FIG. 6, decimal shaft 137 is, through the intervention of the two levers 140, 141 held in an exactly determined axial position from which it may be displaced toward both sides while tensioning the spring 142.

Toward the right with regard to disc 138 the decimal shaft 137 is provided with four radially extending pins 144. These pins are arranged on said decimal shaft 137 in the manner of a helix while they are offset angularly with regard to each other by an equal angle. Their spacing in axial direction corresponds to the spacing of the orders of the counter in the countermechanism. The decimal shaft 137 protrudes on both sides beyond the walls 135, 136 while a nut 145 provided at the left-hand end of the decimal shaft 137 serves as an adjustable abutment for the decimal shaft during its displacement toward the right, while a disc 146 provided at the right-hand end of decimal shaft 137 serves as an adjustable abutment during its displacement toward the left. The walls 135, 136 in this connection serve as counter-abutments.

At the right-hand end of the decimal shaft 137 and fixedly connected to the disc 146 there is provided a pinion 147 with triangularly shaped, relatively long teeth while the angle between two consecutive teeth amounts to the same angle that the abutment pins 144 are offset with regard to each other. An arresting latch 148 has its lower triangularly shaped end 148' located in the space between two adjacent teeth. Latch 148 is journalled on the upper arm 150 of an angle lever 150, 151 so as to be tiltable about a stud 149. The latch 148 is held in engagement with the pinion 147 by means of a spring 152 provided between the lever arm 150 and an eyelet in the latch 148. Thus, latch 148 determines the proper radial position of the decimal shaft 137. Angle lever 150, 151 supporting the latch 148 is tiltably arranged about a stud 153 provided at the outside of the right-hand wall 136 (with regard to the drawing). Angle lever 150, 151 is held in its basic position against a pin 155 provided in wall 136 by means of a tension spring 154 connected to said wall and the upper arm 150 of angle lever 150, 151. A further pin 156 is provided on the outside of the right-hand wall 136. The upper front portion of the latch 148 is located slightly below pin 156 while the rear portion of latch 148 is directly located therebelow. As will be explained further below, the angle lever 150, 151 may be tilted in counter-clockwise direction by a certain distance (see FIG. 6) whereby the decimal shaft 137 is, through the intervention of latch 148, brought into its effective position.

Figure 6:
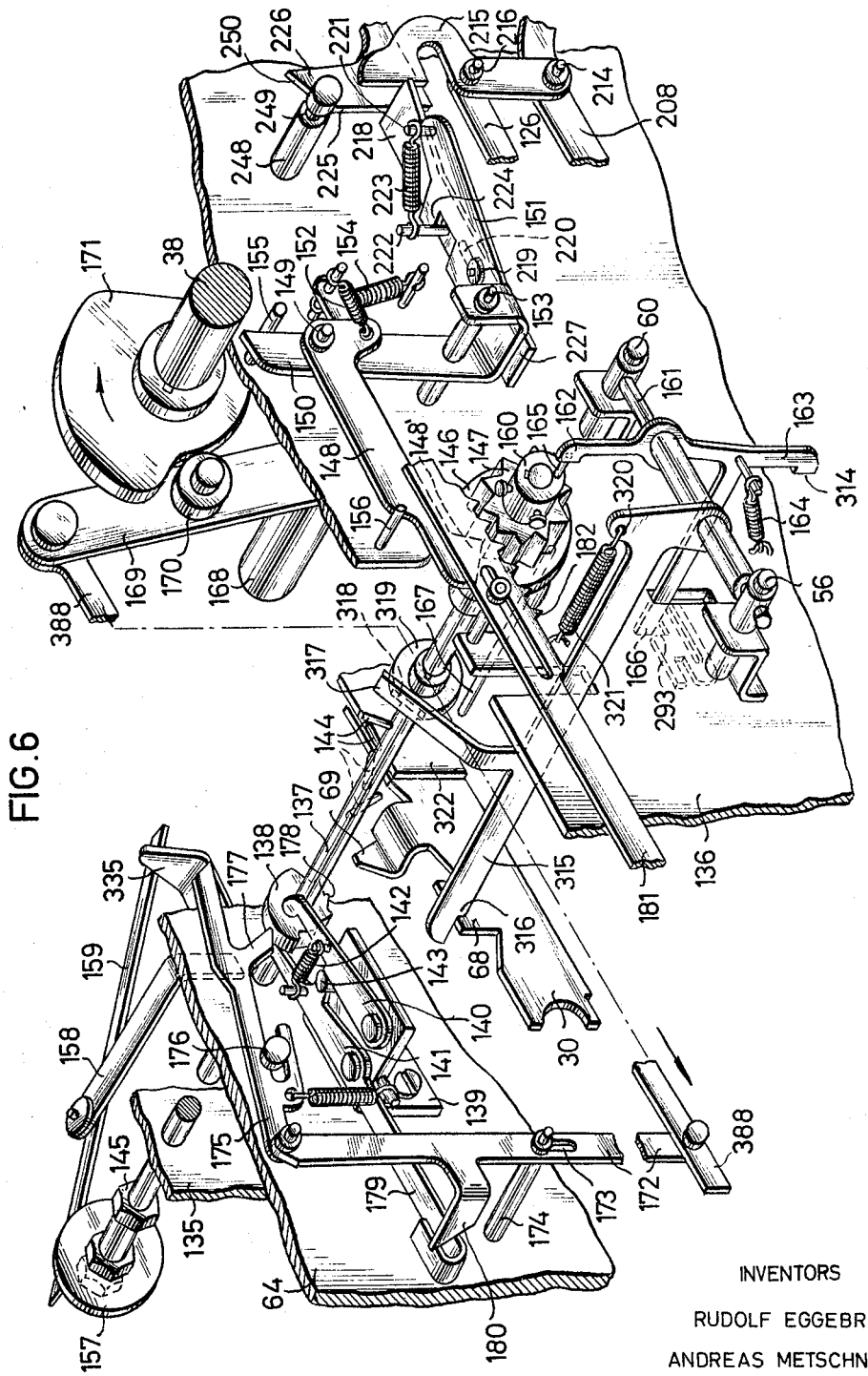
FIGURE 6 is an isometric view of a so-called decimal point abutment shaft, said figure also illustrating control discs and link systems cooperating with said shaft.

As will be evident from FIG. 6, during a displacement of the decimal shaft 137, the arresting latch 148 is tiltable in clockwise direction. However, if the latch 148 is displaced toward the left due to tilting of the angle lever 150, 151 about stud 153, it is arrested in its position above pinion 147 by means of the pin 156.

A disc 157 is provided at the left-hand end of decimal shaft 137, which disc serves as abutment for a transmission lever 159 tiltably connected to an angle 158. Transmission lever 159 serves for switching on the main machine coupling 37, as will be described in connection with FIG. 10, when the register carriage 30, approaching from the right for the output of the product, abuts against one of the abutment pins 144 on decimal shaft 137.

The right-hand end of decimal shaft 137 is provided with a hub connected to the pinion 147 the right-hand end face 160 of which serves as a further abutment for making effective a control linkage which in its turn switches on the main machine coupling 37. For this purpose, on a stud 161 connected to the round guiding means 56 and 60 protruding toward the right, there is provided a two-arm lever 162, 163 which, through the intervention of a tension spring 164 connected to wall 36 and lower lever arm 163, is normally held in a position (see FIG. 6) in which it is tilted in clockwise direction. In the O-position of the decimal shaft 137 (shown in FIG. 6) an unlocking pin 165 connected to the end face 160 is located opposite the end of the upper lever arm 162. The lower lever arm 163 is furthermore provided with an extension 166 serving as an abutment. The significance of pin 165 and abutment 166 will be explained further below. An abutment pin 167 is provided on the inside of disc 146 and points toward the left. Pin 167 serves as abutment during the division with largest possible quotient.

FIG. 6 also shows the drive for the linkage 388 mentioned during the description of FIG. 4 by means of which the register carriage 30 is brought into its basic position when turned on after completed output of the product. Linkage 388 is hinged to one end of a lever 169 tiltable about a shaft 168. Lever 169 is provided with a roller 170 against which rests a cam 171 connected to the main machine shaft 38 during a rotation of the latter and thereby imparts a reciprocatory movement onto the linkage 388. Normally, linkage 388 carries out this movement without having any effect whatsoever. The left-hand end of linkage 388 is, however, hinged to a control rod 172 which is mounted on a bolt 174 on the right side of the intermediate wall 64 so as to be displaceable in upward direction through the intervention of an oblong hole 173. A lever 175 is tiltably connected to the upper end of control rod 172 while lever 175 is tiltable about and displaceable relative to a stud 176 on wall 64. Lever 175 has its right-hand end (with regard to FIG. 6) provided with a control latch 177 which engages teeth 178 of the disc 138 if it is displaced in downward direction. Furthermore, the left-hand lever 141 has its rear end portion provided with an extension 179 located within the range of movement of an inclined edge 180 provided at control rod 172.

As will be evident from FIG. 6, during a movement of the decimal shaft 137 toward the left effected by tilting the left-hand lever 141 with its extension 179, the control rod 172 is, through the intervention of the inclined edge 180, lifted whereby the left-hand end of linkage 388 is on one hand brought into the range of movement of the angle lever 79, 80 (see FIG. 4) and on the other hand, the latch 177 engages the teeth in disc 138. This, in turn, effects the return of the register carriage into its left-hand basic position and the release of the register carriage, due to the tilting of the decimal shaft 137 through the intervention of the control cam 171 provided on main machine shaft 38.

Aside from the already mentioned condition that the abutment pins 144 have to be arranged on the decimal shaft 137 with a spacing corresponding to the spacing of the individual digits, while the angle with which they are radially spaced from each other has to be selected in such a way that during a displacement of the decimal shaft 137 by an angle somewhat smaller than half the above-mentioned angle, the dog 69 on carriage 30 can pass in front of or behind the pins 144 without engaging the same, also the following requirement has to be met: the axial displacement $w$ of the decimal shaft 137 must equal half the thickness $d_1$ of the abutment pins 144 plus half the thickness $d_2$ of the dog 69 on carriage 30. In this way, the result is obtained that the register carriage is held, independent of its abutting direction of movement, by one of the abutment pins 144 in the respective adjusted position of the decimal point and with the decimal point in the proper place. In this adjusted position, the register carriage 30 is, for the input and output of the numerical values and for carrying out the calculating operations, additionally arrested by means of a rotating disc (not shown in the drawing) and by grooves 67 provided in the guiding sleeves 65 and 66 (see FIG. 4).

For purposes of presetting the decimal shaft 137 by means of the adjusting knob 15 provided in the calculating machine, the outside of the right-hand wall 136 (FIGS. 7 and 8) is provided with an adjusting slide 181 which is displaceable by means of slots and bolts. The bottom side of the adjusting slide 181 is within the range of the pinion 147 provided with teeth 182 loosely engaging the teeth of the pinion 147. Between the teeth 182 and the teeth of the pinion 147 just sufficient play is left so that when displacing the adjusting slide 181, the pinion 147 and thereby the decimal shaft 137 may be advanced in a stepwise manner, but when displacing the pinion 147 by means of latch 148, a tilting corresponding to approximately half the pitch angle of the teeth of the pinion or half the angle between the pins 144 is effected so that in this tilted position, the dog 69 may pass between the abutment pins 144.

The front end of the slide 181 is provided with further teeth 183 the pitch angle of which corresponds to that of the teeth 182. In the space between the teeth 183 there is provided a roller 184 connected to a lever 185 which is tiltable about a stud 186 at the right-hand wall 136. Lever 185 by means of a spring 187 interposed between the wall 136 and the lever 185, holds the roller 184 in engagement with the teeth 183. The left-hand end of lever 185 is provided with an extension 188 which is normally located above balls 190 of a ball arresting mechanism provided in a U-shaped channel member 189.

Lever 185 has furthermore hinged thereto a rod 191 which is also displaceable along wall 136 by means of studs and oblong holes. The lower end of rod 191 is provided with a pin 192 which rests against the circumference of the control disc 131 provided with recesses 134 and shown in FIG. 5.

It may be mentioned that the ball arresting mechanism comprising the channel member 189 and the balls 190 alternately arrests function control keys for plus and minus calculations 2 and 3, for multiplication and division 5 and 6, and the result key 7. It is also clear from FIGS. 7 and 8 that the slide 181 provided with the adjusting knob 15 can be displaced only if none of the above-mentioned function control keys is pressed down, or if other words, the program control shaft 118 is in its basic position in which the pin 192 is adapted to engage one of the recesses 134 during a displacement of the slide 181 and a tilting movement of the lever 185 in downward direction. These two arresting mechanisms thus prevent a displacement of the adjusting slide 181 after a function control key has been actuated and after the program control shaft 118 has been turned so that with each calculating cycle the same position of the decimal point is maintained.

Figure 7:
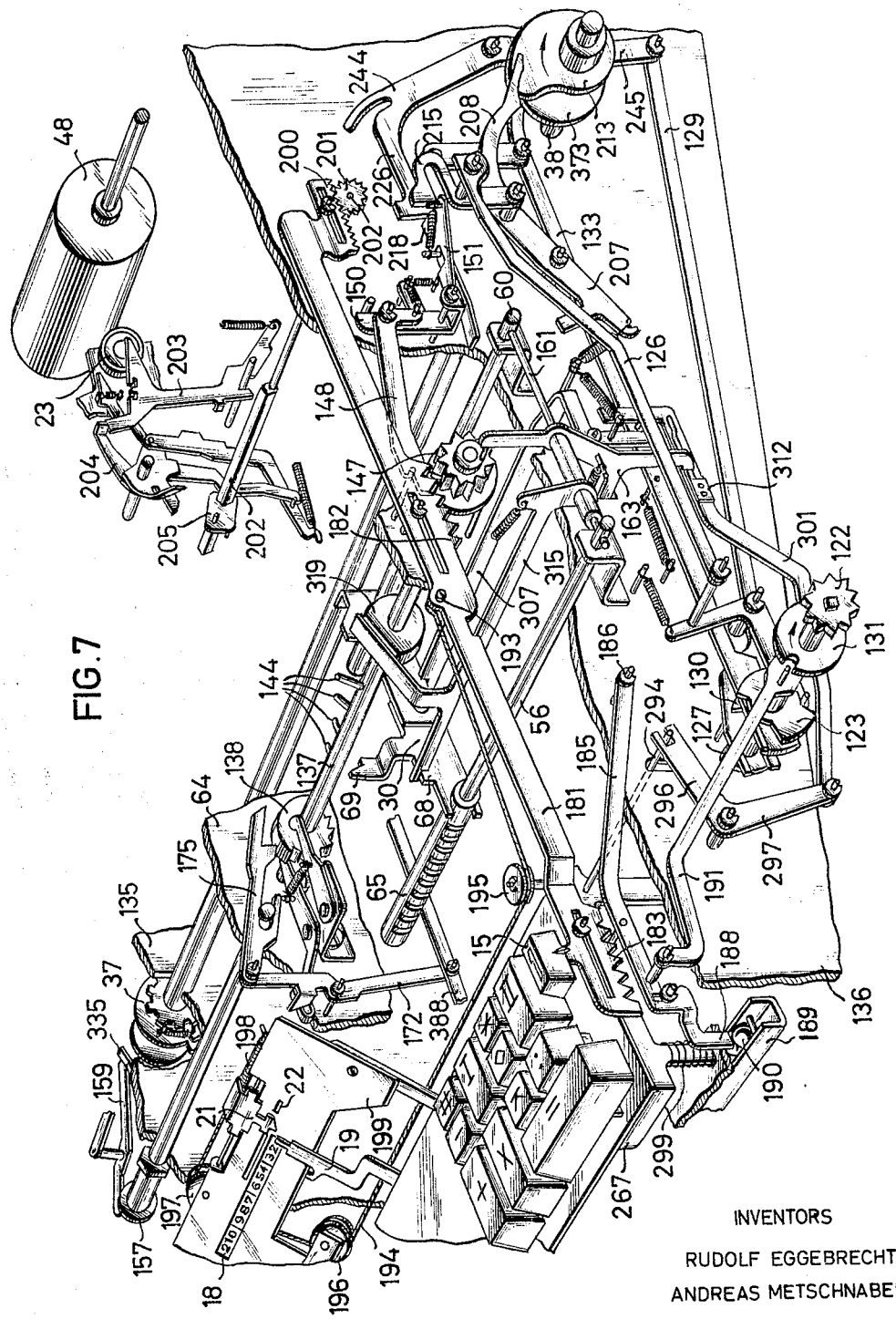
FIGURE 7 is an isometric view of a portion of the calculating machine with the decimal point abutment shaft according to the present invention.

As may be seen from FIG. 7, the following further indicating and adjusting devices are connected to the adjusting slide 181. A cable 194 is connected to slide 181 by means of a threaded pin 193. Cable 194 has its other end connected to a scale plate 199 and is guided over deviating rollers 195, 196 and 197 and is under the tension of a spring 198. The upper end of cable 194 is connected to pointer 21 previously mentioned. Pointer 21 is above scale 18 moved toward the left when the adjusting slide 181 is moved toward the rear (with regard to FIG. 7).

The end portion of adjusting slide 181 is provided with teeth 200 engaged by the teeth of a pinion 201 fixedly connected with an adjustment shaft 202 extending through the calculating machine and having its center portion designed as a square shaft. As has been mentioned above, the first four numeral wheels of the printing mechanism 23 are provided with decimal point keys 203 which normally are held in an ineffective position by means of an arresting lever 204. However, the decimal point keys 203 are selectively released by the levers 205 provided on adjusting shaft 202 together with a displacement of the adjusting slide 101. When the printing mechanism is actuated, in the respective adjusted decimal place, a decimal point is printed. The structure of this decimal point printing mechanism is not further referred to inasmuch as it does not appear to be necessary in connection with the description of the present invention.

*Device for automatically switching off the decimal shaft by the program control shaft and the main machine shaft*

In order to displace the decimal shaft 137 out of and into the path of movement of the dog 69 of carriage 30, in conformity with the function control course of the calculating machine controlled by the program shaft 118 during the dividing and multiplying operations, the following devices are provided: The right-hand wall 136 is provided with a two-arm lever 207, 208 tiltable about a bolt 206. The arm 207 of said two-arm lever 207, 208 is engaged by a tension spring 210 connected to an angle iron 209 which spring 210 urges the lever 207, 208 to abut the angle 209. An abutment surface 211 of lever arm 208 rests on a bolt 212 connected to a disc 213 fixedly connected to the main machine shaft 38. A lever 215 is hinged to a stud 214 provided in the center of the lever arm 208, while the control rod 126 cooperating with the program control shaft 118 is hinged to a bolt 216. As will be evident from FIG. 6, the bottom side of lever arm 151 of the angle lever 150, 151 is provided with a slide member 218 tiltable about a stud 219 on lever arm 151. Slide member 218 is furthermore displaceably arranged by means of an oblong hole 220. Between a pin 221 connected to lever arm 151 and pin 222 connected to the slide member 218, a spring 223 is provided by means of which the pin 222 is held in engagement with an edge 224 of lever arm 151. Slide member 218 may be displaced by a control edge 225 of an extension 226 toward the left, as will be explained further below, so that the front end 227 of slide member 218 may be brought into the range of movement of the register carriage 30 prior to the latter reaching its right-hand reversing position.

Figure 8:
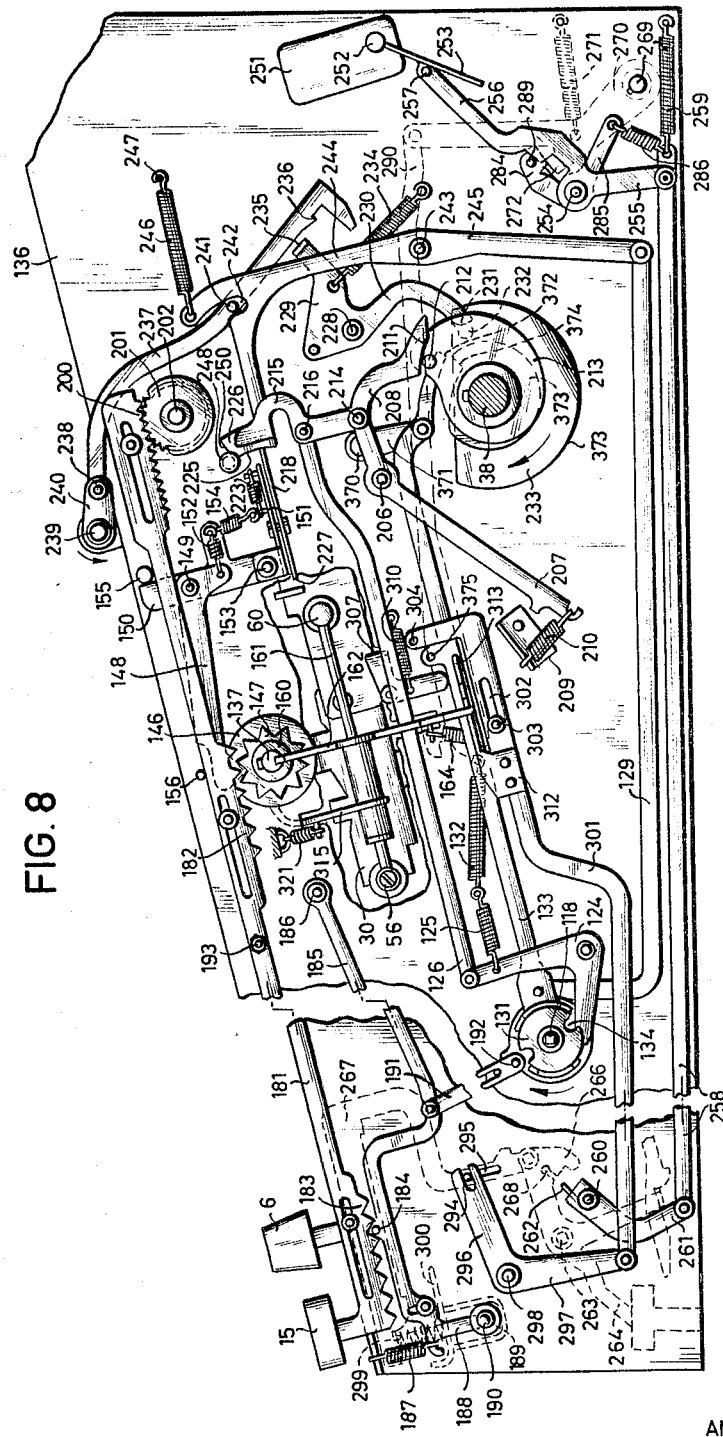
FIGURE 8 is a side view of the calculating machine according to the present invention showing only those parts of the calculating machine necessary for an understanding of the device according to the present invention.

FIG. 8 shows that with a rotation of the main machine shaft 38 in clockwise direction, bolt 212 disengages the abutment edge 211 and that thereby the spring 210 tilts the lever 207, 208 in clockwise direction while it lowers the lever 215 to such an extent that it is located below the slide member 218 connected to lever arm 151. Shortly prior to completion of the rotation of the main shaft 38, the lever 215 is lifted again. If the control rod 126 is moved toward the left from the position shown in FIG. 8 by means of the control disc 123 provided on program control shaft 118, with the subsequent rotation of shaft 38, the upper end of the lever 215 moves below the right-hand end of slide member 218 so that toward the end of the rotation of shaft 38, the decimal shaft 137 is moved into its ineffective position by means of the angle lever 150, 151 and the latch 148. As has already been mentioned, the above displacement is effected after the second revolution of the main machine shaft 38, i.e. after the input of the divisor or multiplier into the counter mechanism and is made ineffective again at the latest with the last revolution of the main machine shaft 38. This means that the register carriage 30 may be moved unimpededly for carrying out the calculating programs.

In order to be able to effect the output of the product with the decimal point in the proper place, in conformity with the pre-set decimal point, the calculating machine according to the present invention is, for multiplications with a pre-set decimal point, provided with the following device: A two-arm lever 244, 245 is tiltably journalled on a bolt 243 connected to the right-hand wall 136 (FIG. 8). A tension spring 246 is connected to the upper lever arm 244 of lever 244, 245, which spring 246 is connected to a pin 247 in wall 136. The extension 226 provided with the control edge 225 is connected to the upper lever arm 244 while extension 226 is guided with a guiding edge 250 in a groove 249 (FIG. 6) of a bolt 248 connected to the right-hand wall 136. The lower lever arm 245 of the two-arm lever 244, 245 is hinged to the control rod 129 which is moved toward the right by the control disc 127 provided on program control shaft 118 in the control position IV following the input of the multiplier.

Due to the abovementioned movement, the slide member 218 provided on lever arm 151 is, through the intervention of the lever 244, 245, the extension 226 and the control edge 225 brought with its left-hand end 227 into the range of movement of the register carriage 30. If, after the multiplication has been completed, register carriage 30 abuts against the end 227 of the slide member 218, the latter is tilted about the bolt 219 to such an extent that the rearward end of the slide member 218 slides off the upper end of lever 215 located below the right-hand end of slide member 218 and the angle lever 150, 151 returns into its basic position in view of the tensioning of the spring 154 while thereby decimal shaft 137 is brought into its effective position in order to stop the register carriage for the output of the product. As has already been referred to above, following the output of the product carried out by the main machine shaft 38, the decimal shaft 137 is once more tilted by the control latch 177 whereby the register carriage 30 is returned to its left-hand basic position.

*Manual switching-on of the drive motor and the main machine coupling*

Figure 9:
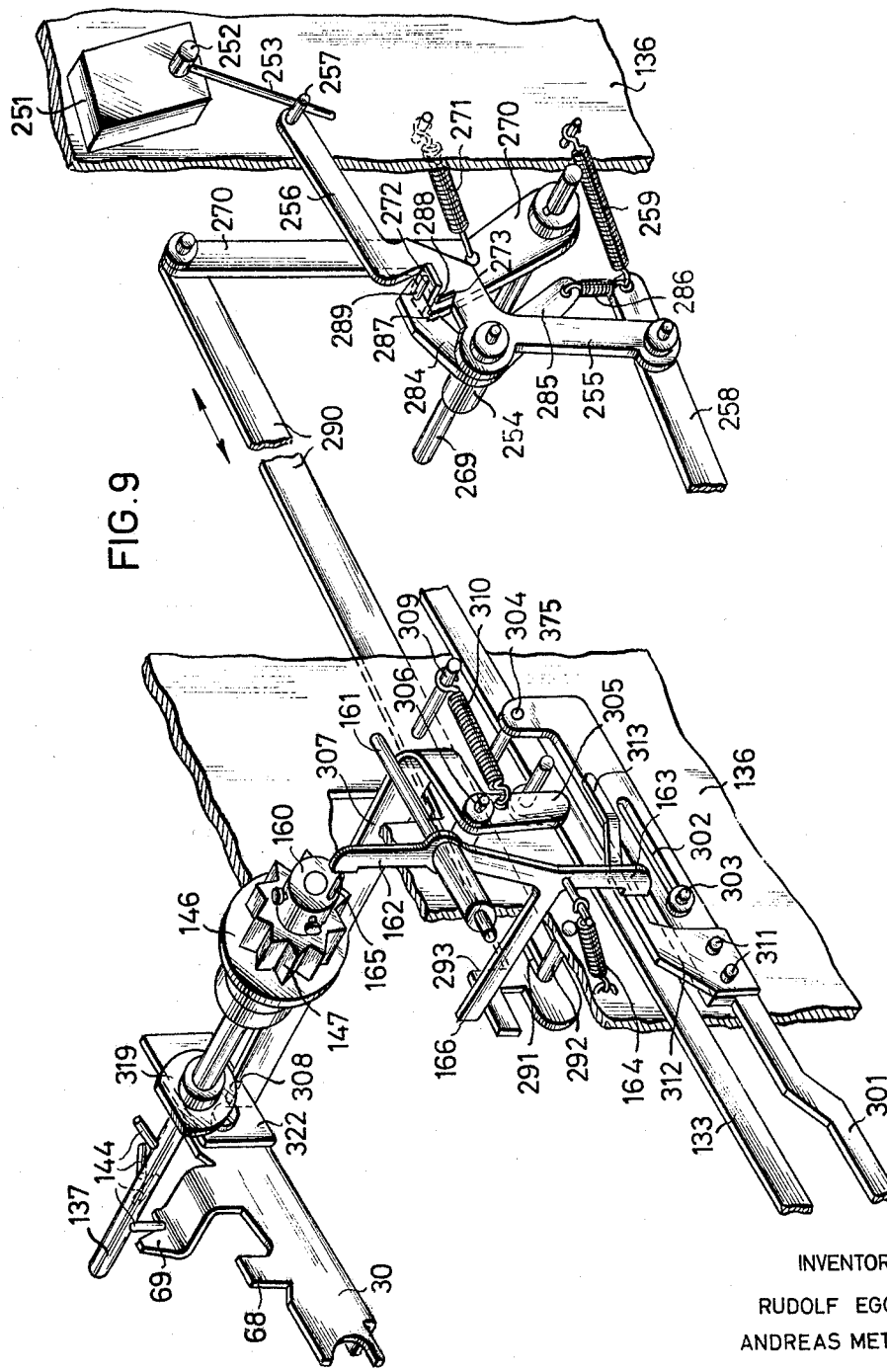
FIGURE 9 is an isometric view of a portion of the calculating machine according to the present invention, and more specifically indicating the control for the main coupling of the calculating machine.

In order to be able to switch on the drive motor when actuating one of the function control keys 2 to 9, the outside of the right-hand wall 136 has connected thereto a switch 251 (see FIGS. 8 and 9). Switch 251 energizes the motor 35 (FIG. 2) by tilting lever 253 in counterclockwise direction about the shaft 252.

Below the motor switch 251 a two-arm lever 255, 258 is tiltably arranged about a shaft 254 while the upper arm 256 of said two-arm lever 255, 256 carries a pin 257 resting against the lever 253 of switch 251. The lower lever arm 255 of said lever is hinged to a control rod 258 which is held in a position displaced toward the right by means of a tension spring 259 connected to rod 258 and wall 136 in which the motor switch 251 is open (FIGS. 8 and 9). Control rod 258 is hinged to the lower end of a lever 261 connected to a shaft 260 in the front portion of the calculating machine. Shaft 260 is provided with a radially extending small strip 262 located within the range of the function control keys (see FIG. 8).

A plurality of multi-arm levers arranged one after the other is tiltably journalled on a shaft 263 parallel to shaft 260. Those levers thereof which are connected to the function control keys 5 to 7 are designed as three-arm levers (see FIGS. 5 and 8). One arm 264 of each three-arm lever serves as an abutment, a second arm 265 serves for releasing the slides 104 to 106 for the program control shaft, and the upper arm 266, and which is hinged to the respective key stem 267, is provided with a notch 268 located opposite to the strip 262 on shaft 260.

When pressing down one of the function control keys 5 to 7, the corresponding lever 264 to 266 is tilted in clockwise direction while the notch 268 engages the strip 262 so that the control rod 258 is moved toward the left through the intervention of the lever 261 while simultaneously the spring 259 is tensioned and the motor switch 250 is actuated. Due to the tilting movement of the strip 262 relative to the notches 268 of the function control keys not pressed down, the latter are arrested and cannot be actuated.

Figure 10:
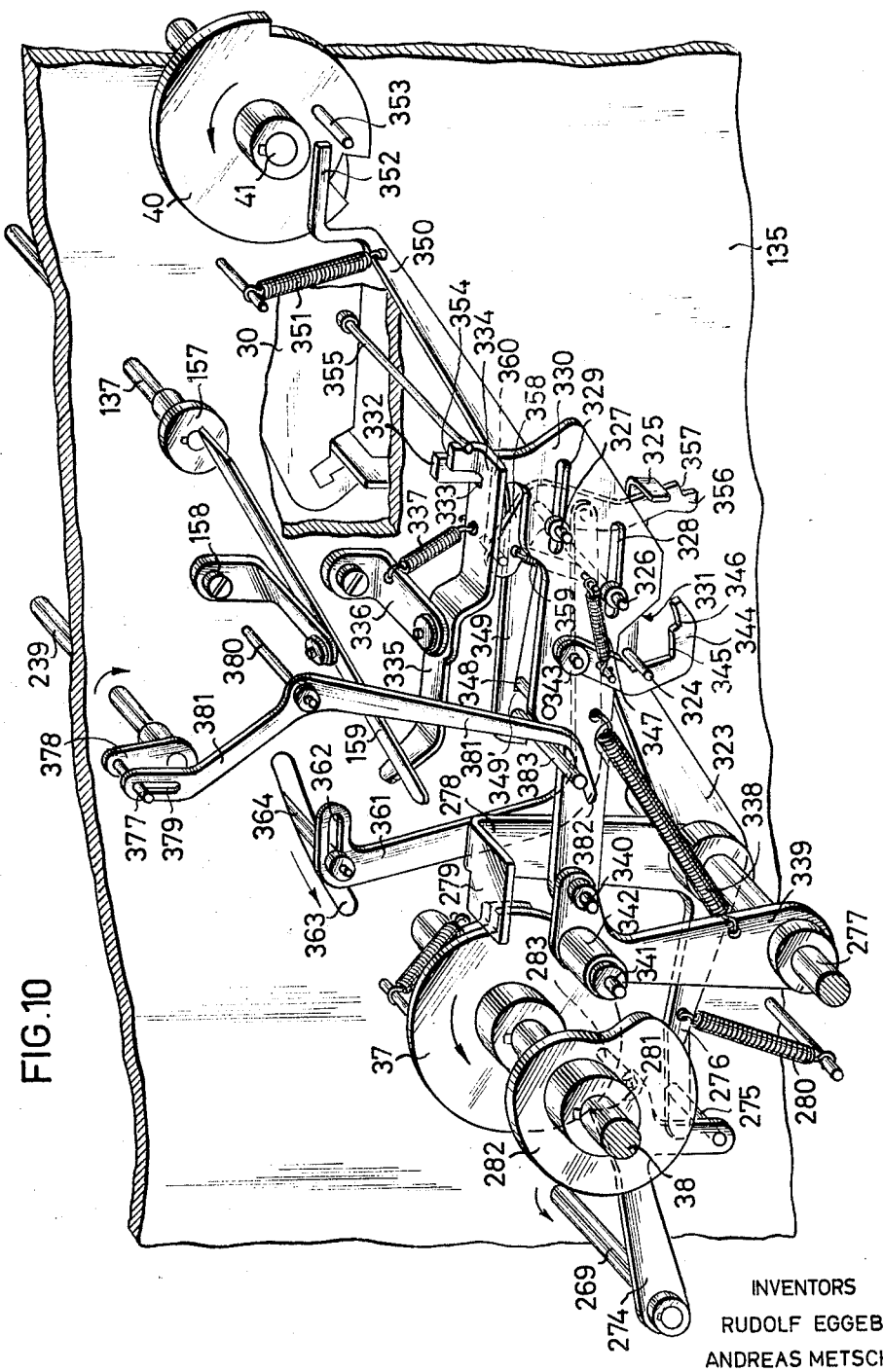
FIGURE 10 is an isometric view of a portion of the calculating machine according to the present invention with the control link system for the switching-on and switching-off operations of the main coupling.

After the motor 35 has been switched on, it is necessary to switch on the main machine clutch 37 shown in FIGS. 2 and 10 so that it carries out a revolution. For this purpose, a shaft 269 extending through the calculating machine from the right to the left, is rotatably journalled in the vicinity of the lever 255, 256. A lever 270 is connected to shaft 269 within the wall 136 and is tiltable in clockwise direction by means of a strong tension spring 271 connected to wall 136 (see FIGS. 8 and 9). A bent extension 272 provided on lever 270 protrudes through an opening in wall 136 toward the outside and interlocks the lever 270 and the lever 255, 256 in the basic position of the latter while the spring 271 is tensioned and while the right-hand edge of the extension 272 rests against an edge 273 of the lever arm 256, which edge is perpendicular to the extension 272. As will be evident from FIGS. 8 and 9, when tilting lever 255, 256 in clockwise direction, the edge 273 releases the extension 272 after a certain tilting angle has been completed, so that the spring 271 turns the shaft 269 in clockwise direction.

As shown in FIG. 10, the other end of shaft 269 is, outside the left-hand wall 135, provided with a lever 274 supporting the lever arm 276 of a multi-arm releasing lever by means of a pin 275. This releasing lever is tiltable about a shaft 277 and is provided with a further lever arm 278 with a bent portion 279, serving as releasing latch. This releasing lever is held against the main machine coupling 37 by means of a spring 280 whereby main machine coupling 37 is in a manner known per se held in its resting or switched-off position by said latch. The right-hand end of lever 274 is furthermore provided with a curved surface 281 located within the range of movement of a pin 283 provided on main machine coupling 37.

As will be evident from FIG. 10, when tilting the control shaft 269 in counter-clockwise direction, the latch 279 releases the clutch 37 so that the latter can carry out one revolution. Toward the end of this revolution, the spring 271 (FIGS. 8 and 9) is tensioned by means of the pin 283 abutting the curve 281 so that also the lever 270 can be interlocked with the extension 272 at the edge 273 of the lever arm 256.

The return of the lever 270 into its ineffective position through the intervention of the rotating main machine shaft 38 is effected in such a jerky manner that a catching latch 284 is provided on the shaft 254 of the lever 255, 256 in order to assure the return movement. Latch 284 is tilted in clockwise direction and held by a spring 286 engaging the linkage 258 and the lever arm 285 (see FIGS. 8 and 9). Catching latch 284 interlocks, during the return movement of the lever 270, first with an edge 287 with the extension 272 of the lever 270. If subsequently, the lever 255, 256 moves into its ineffective position in counter-clockwise direction, the edge 288 of the lever arm 256 engages the pin 289 provided on latch 284 and lifts the latch 284 to such an extent that the lever 270 is interlocked with the extension 272 with the edge 273 of the lever arm 256. In this way, during a tilting movement in clockwise direction, it can again be released.

It may be mentioned that with the main coupling switched on, the motor switch 251 may remain switched on by arresting the lever 255, 256 tilted in switched-on position by means of the extension 272 of the lever 270 resting on the edge 288 of the lever arm 256 while the spring 259 is under tension. The control rod 258 can by means of the spring 259 be returned only after the lever 270 has been brought into its switched-off position and the spring 271 has been tensioned.

*Dividing with and without preset decimal point*

In order to assure that with the calculations involving a decimal point pre-set by means of the adjusting slide 181 and the decimal shaft 137, with the input of the dividend, the main machine coupling 37 is switched on only when the register carriage abuts with its dog 69, a pin 144 located in the path of the dog 69, the following arrangements are provided in the calculating machine: The lever 270 connected to shaft 269 has hinged thereto a rod 290 which has its end guided by a stationary stud 292 and an oblong hole 291 and which is furthermore provided with an abutment edge 293. Abutment edge 293 is, in the basic position of the lever 270 located somewhat to the left of the abutment or extension 166 (see FIGS. 6 and 9).

As will be explained further below, the abutment or extension 166 provided at the lever 162, 163 carries out the switching-on of the main machine coupling 37 after the register carriage has stopped, in view of its abutment against one of the abutment pins 144 of the decimal shaft 137.

As will be evident from FIG. 8, the U-shaped key stem 267 connected to the division key 6 is, close to its lower end, provided with a pin 294 which extends toward the outside through an oblong hole 295 in the wall 136 and which is located within a slot provided at the end of a lever arm 296 of an angle lever 296, 297. Angle lever 296, 297 is tiltable about a stud 298 in wall 136. A spring 299 is connected to key stem 267, which spring abuts against a machine stationary plate 300 and holds the key stem 267 and thereby the division key 6 in its ineffective position. A control rod 301 is hinged to the lower end of lever arm 297 while rod 301 is, by means of an oblong hole 302 and a machine stationary pin or stud 303, displaceably mounted on the outside of the wall 136. Control rod 301 has its rearward end bent in upward direction and provided with a pin 304 which is located behind a lever arm 305 of a first carriage arresting lever 307 tiltable about a stationary shaft 306. Arresting lever 307 protruding toward the left into the calculating machine, has its left-hand end provided with an abutment edge 308 against which the register carriage 30 is arrested in its left-hand basic position. A tension spring 310 connected to a machine stationary pin 309 and the lever arm 305 holds the arresting lever 307 from underneath in engagement with the register carriage 30, if control rod 301 has not been released. Control rod 301 has within the range of movement of lever arm 163, furthermore connected thereto by means of rivets 311 a leaf-spring 312 cranked in upward direction and toward the outside. The rearward and outwardly bent end 313 of 312 is located behind an edge 314 of the lever arm 163.

A second arresting lever 315 is provided at the outside of the right-hand wall 136 and tiltable about a stud 161. Arresting lever 315 likewise holds the register carriage 30 in its basic position by interlocking the same with the abutment 68 by means of an abutment edge 316 provided at lever 315. The second arresting lever 315 has a bent-off extension 317 which rests upon a surface 318 of a disc 319 which in its turn is connected to the decimal shaft 137 below the extension 317. A tension spring 321 provided between the wall 136 and an eyelet 320 of the arresting lever 315 holds the arresting lever 315 with its extension 317 against the surface 318 of the disc 319 (see FIG. 6) while simultaneously the left-hand end of lever 315 rests upon the abutment 68 of carriage 30 and while the edge 316 holds the carriage 30 in its left-hand basic position.

If the decimal adjusting slide 181 is by means of the adjusting knob 15 brought into 0-position, the decimal shaft 137 occupies the position shown in FIGS. 6 to 8 in which the register carriage 30 is arrested in its lefthand basic position by means of the arresting lever 315 and in which furthermore, the upper lever arm 162 of the lever 162, 163 has its upper end located to the right of the unlocking pin 165 provided on the abutment surface 160.

If, however, as shown in FIG. 8, the decimal adjusting slide 181 is moved into one of the decimal positions 1 to 4 by means of the adjusting knob 15, the decimal shaft 137 is turned by means of the teeth 182 so that through the intervention of the turned disc 319, the arresting lever 315 is tilted upwardly and releases the register carriage 30. Simultaneously, the pin 165 has been turned out of the range of movement of the lever arm 162.

If now, for instance, following the input of the dividend by means of the numeral keyboard 1 (see FIG. 1) and subsequent pressing down of the division key 6 (FIG. 8) the motor switch 251 is actuated through the intervention of the control rod 258 in the manner described above, and if simultaneously through the intervention of the control rod 301 and the arresting lever 307 the register carriage 30 is released so as to move toward the right, first the two-arm lever 162, 163 is tilted in counter-clockwise direction in view of the leaf-spring 312, 313 provided on control rod 301 while simultaneously the spring 164 is tensioned. In view of this movement, the lever arm 162 abuts against the surface 160 of the decimal shaft 137 and the extension or abutment 166 is moved into the range of movement of the edge 293 of rod 290 and thereby holds the lever 270 released by the lever arm 256 nevertheless in its ineffective position. Subsequently, the register carriage 30 moving toward the right due to the tension of the spring 33 abuts against one of the abutment pins 144 on decimal shaft 137 so that register carriage 30 tilts the lever 162, 163 in clockwise direction while the leaf-spring 312, 313 yields so that the extension 166 releases rod 290 and thereby spring 271 switches on the main machine coupling 37 through the intervention of the shaft 269. During the thus initiated rotation of the main machine shaft 38, the dividend is transferred to the main counter 31 of the register carriage 30 with all digits in the proper order.

If, in contrast to the calculating process just described, the adjusting knob 15 is brought into the position indicated on scale 16 by the mark O, the printing of the decimal point does not take place. The decimal shaft 137 occupies in this instance the basic position shown in FIGS. 6 to 8 in which none of the pins 144 is located within the range of movement of the dogs 69, and in which furthermore the arresting lever 315 rests with its extension 317 on the flattened portion 318 of the disc 319 and thus holds the register carriage 30 in its left-hand basic position. Furthermore, the pin 165 provided on the abutment surface 160 is located within the range of movement of the arm 162 of the lever 162, 163. In this way, also the extension 166 provided at the lever arm 163 is tilted in its upward position outside the range of movement of the abutment edge 293.

When actuating the division key 6, the control rod 301 is, through the intervention of the single lever 296, 297 moved toward the left, as was also the case with the process described above, so that the pin 304 provided on rod 301 releases the arresting lever 307. This, however, does not have any effect inasmuch as the arresting lever 315 still holds the register carriage 30 in its basic position. The pin 165 furthermore prevents leaf-spring 312, 313 from tilting the lever 162, 163 with its extension 166 in counter-clockwise direction. The end 313 of said leaf-spring 312, 313, however, slides underneath the edge 314 of the lever arm 163 whereby the rod 190 can no longer be held by the extension 166. Inasmuch as furthermore, with the actuation of the division key 6, the motor switch 251 has been actuated and thereby the lever arm 256 tilted in clockwise direction has released the lever 270, thus immediately following the switching-on of the drive motor, the main machine coupling 37 is likewise switched on. The numerical value keyed into the pin carriage or recalled from the auxiliary storage member is thus transferred to the main counter 31 and more specifically, in the basic position of the register carriage 30.

If, as a third possibility, the adjusting knob 15 is reset by one step to the mark 17 on scale 16, the following situation prevails. Due to the return movement of the decimal shaft 137 by one step, the pin 167 connected to the disc 146 and extending parallel to the decimal shaft 137 is moved into the range of movement of the dog 69 on the register carriage 30. Furthermore, the disc 319 connected to the decimal shaft 137 is turned to such an extent that the arresting lever 315 is lifted so as to become ineffective and the pin 165 provided on the end face 160 of the decimal shaft 137 is moved out of range of movement of the lever arm 162. If now, the division key 6 is pressed down, the release of the lever 270 by the extension 166 is delayed by the control rod 301 and the leaf-spring 312, 313 until the dog 69 abuts against the pin 167 of the decimal shaft 137, and until the extension 166 is lifted due to the turning movement of the lever 162, 163 whereby the lever 270 is released for switching on the main machine coupling 37. Also with this calculating operation, the printing of the decimal point does not take place.

After the input of the dividend, the calculating machine is stopped by the latch 279 engaging again the main machine coupling 37. The control rod 301 and the division key 6 return to their basic or ineffective position. Toward the end of the rotation of the main machine shaft 38, the slide 104 (FIG. 5) has moved the program control shaft 118 into the control position I and thereby has prepared the input of the divisor into the machine stationary counter or register. If, subsequently, following the input or the recall of the divisor, the result key 7 is pressed down, the machine carries out the following operations: The motor is switched on by the control rod 248 (as was the case before) and inasmuch as the rod 290 is no longer held by the extension 166, also the main machine coupling 37 is simultaneously switched on by the spring 271. In this way, the input of the divisor into the stationary counter or register 29 is effected. Simultaneously, the program control shaft 118 is displaced by two steps into the control position III and the cam 123 effects a displacement of the control rod 126 toward the left through the intervention of the angle lever 124, whereby the lever 215 is moved below the slide member 218. Toward the end of the rotation of the main machine shaft 38, the tilting of the decimal shaft 137 into its 0 or ineffective position is effected through the intervention of the pin 212, lever 208, the lever 215, the angle lever 150, 151 and the arresting latch 148. In this way, when dividing decimal numbers, the pins 144 are made ineffective, when dividing with largest possible quotient, the pin 167 is made ineffective, and when dividing whole numbers, the arresting lever 315 is made ineffective in view of a turning movement of the disc 319, so that in all of these three cases, the register carriage 30 is released for a righthand movement.

When calculating with decimal numbers and with whole numbers with largest possible quotient, with the input of the dividend, the arresting lever 307 is released through the intervention of the control rod 301 and the pin 304, and following the input of the divisor, the register carriage 30 is released for a rightward movement by the pins 144 or the pin 167, respectively. When calculating with whole numbers, however, the register carriage 30 would remain in its left-hand basic position inasmuch as it is held by the arresting lever 307 after the arresting lever 315 has been lifted. This, however, is prevented by the control disc 130 of the program control shaft 118 which releases the control rod 133 in the control position III. The control rod 133 is on one hand displaceably and tiltably arranged on the program control shaft 118 and on the other hand is tiltably journalled on a rotatable latch 371 so as to be tiltable about a stud 370 of the right-hand machine wall 136 (see FIG. 8). Control rod 133 has a feeler 372 extending into the range of movement of a cam 373 connected to the main machine shaft 38. After the release of the control rod 133 by the control disc 130, the control rod 133 is held in its position shown in FIG. 8 by the control disc or cam 373 until the main machine shaft 38 has reached its basic position and the feeler 372 can engage a recess 374 of cam 373 in view of the action of the spring 132. In this way the control rod 133 is moved toward the left and makes the arresting latch 307 ineffective through the intervention of a pin 375, as is clearly shown in FIGS. 8 and 9.

Output of the quotient and remainder

The further working operations of the calculating machine according to the present invention during the output of the quotient and remainder will presently be described in connection with the showing of FIG. 10. After the register carriage 30 has been reversed in its outermost right-hand position, as described in connection with FIG. 4, the calculating process proper starts when the highest digit of the dividend and divisor are in alignment with each other. During this calculating process, register carriage 30 moves stepwise into its left-hand basic position whereupon the printing of the quotient and the remainder is effected.

For the automatic release of the main machine coupling 37, a third lever arm 323 is connected with the lever 278 carrying the releasing latch 279, which lever 278 is tiltable about shaft 277 and located below main machine coupling 37 while it may be manually released by means of the lever arm 276. This third lever arm 323 is provided with a pin 324 pointing toward the outside while the right-hand edge of arm 323 is bent off so as to form an abutment 325 extending at a right angle toward the outside. Above and in front of the lever arm 323 there is provided a slide 330 horizontally displaceable by means of two bolts 326 and 327 at the machine wall 137, and two oblong holes 328 and 329. Slide 330 has an inclined edge 331 which is located in front of the pin 324 of the lever arm 323. Slide 330 has its upper right-hand end provided with an extension 332 pointing in upward direction and by means of which it interlocks with an edge 333 of a two-arm lever 334, 335. Lever 334, 335 is tiltable about an angle iron 336 and is held in engagement with the abutment 332 of the slide 330 in counter-clockwise direction by means of a tension spring 337 (see FIG. 10).

Slide 330 is engaged by a strong tension spring 338 the left-hand end of which is either connected to the machine wall 135 or, as shown in FIG. 10, to a lever 339 adjacent the shaft 277. Spring 338 continuously urges the abutment 332 of the slide 330 into engagement with the edge 333 of the lever arm 334. The left-hand end of slide 330 is hinged to the upper end of the lever 339 by means of a bolt 340. The upper end of lever 339 is furthermore provided with a stud 341 rotatably supporting a roller 342. Roller 342 is located within the range of movement of the cam 282 mounted on main machine shaft 38.

As will be evident from FIG. 10, in case the slide 330 is moved toward the left by means of the spring 338, the inclined edge 331 engages the pin 324 and thereby tilts the lever 276, 278, 323 in clockwise direction, so that the latch 278 releases the main machine coupling 37. Toward the end of the rotation of the main machine shaft 38, the cam 282 pulls back the spring 338 while the abutment 332 is located behind the edge 333 of lever arm 334 with a small excess stroke of the slide 330.

For purposes of limiting the angle of rotation of lever 276, 278, 323 and also for purposes of braking the slide 330 actuated by the cam 282, slide 330 is provided with a lever 344 tiltable about a stud 343. Lever 344 is provided with steps 345, 346 located within the range of movement of the pin 324 while lever 344 is held in engagement with the pin 324 by means of a spring 347. Furthermore, the slide 330 is provided with a pin 348 pointing toward the machine wall 135. Pin 348 may be locked behind an edge 349' of the lever arm 349 of a two-arm lever 349, 350 which lever is tiltable about a bolt 327 and held in engagement with the pin 348 by means of a spring 351 connected to the lever arm 350. A horizontally extending extension 352 of the lever arm 350 is located within the range of movement of the pin 353 on disc 40 pertaining to the coupling of the counter mechanism and located on counter or calculating shaft 41.

As may clearly be seen from FIG. 10, during a rotation of the calculating shaft 41 in the direction of the arrow, the pin 353 tilts toward the end of its revolution the lever 349, 350 in clockwise direction whereby the arresting edge 349' releases the pin 348 provided on slide 330 for a short period of time.

Furthermore, the right-hand lever arm 334 of the two-arm lever 334, 335 provided at the angle iron 336 has its right-hand end provided with an extension 354 bent in upward direction, which abutment 354 is located within the range of movement of a relatively thin and therefore flexible rod 355 connected to the left-hand end of the register carriage 30. If the last-mentioned rod, during a return movement of the register carriage into its left-hand basic position, abuts against the abutment 354, the lever 334, 335 is tilted in clockwise direction and thereby releases the slide 330. Slide 330 is, however, still held by the lever arm 349. If now, toward the end of the last revolution of the counter or calculating shaft 41, the pin 353 engages the end 352 of the lever arm 350, the edge 349' releases the slide 330. Slide 330 then abuts the pin 324 with its inclined edge 331 so that the main machine coupling 37 is released for the printing of the remainder. The remainder is printed without a decimal point inasmuch as it is not properly located with regard to the pre-set decimal point.

With the printing of the reminder, the program control shaft 118 is brought into its control position V and thereby prepares the printing of the quotient. In this connection, it may be mentioned that the control rod 133 is returned toward the right by means of the control disc 130 while thereby the arresting latch 307 is tilted inwardly (see FIG. 8). Subsequently, for the printing of the quotient, the main machine coupling 37 has to be released once more, which is effected by the following device:

A two-arm lever 356, 358 is tiltable about a stationary bolt 327 while the downwardly pointing arm 356 of said two-arm lever 356, 358 is provided with an abutment edge 357 located in the range of movement of the abutment 325 of the lever arm 323. The upper lever arm 358 of said lever 356, 358 is tilted in counter-clockwise direction by a spring 359 connected to lever arm 358 and the wall 135 while lever arm 358 is held with a pin 360 against the upper edge of the lever 349 and, more specifically, in such a way that the edge 357 provided at the lower lever arm 356 is located within the range of movement of the abutment 325. Furthermore, the lower lever arm 356 of lever 356, 358 has connected thereto a bent control rod 361 the upper end of which is provided with an oblong hole 362 overlapping a pin 364 extending through a slot 363 in wall 135. Pin 364 is connected to a side wall of the tiltable frame 59 of the revolutions counter 32.

The pin 364 is, when the revolutions counter 32 is in its ineffective or switched-off position, in the position shown in FIG. 10 and for the calculating process moves simultaneously with the tilting movement of the counter, within the slot 363 toward the right whereby it moves within the oblong hole 362 toward the right without having any effect. During the tilting movement of the revolutions counter 32 into the racks 28, the pin 364 is moved toward the left within the slot 363 while carrying along the control rod 361. In this way, the lever 356, 358 is tilted in clockwise direction until the edge 357 is moved out of the range of movement of the abutment 325.

As will be evident from FIG. 10, during the output of the remainder, the lever arm 323 is locked by the edge 357 of the lever arm 356 in that position in which it is tilted in clockwise direction so that the main machine coupling 37 remains released also after the slide 330 has returned. However, with the subsequent printing of the quotient the edge 357 is through the intervention of the pin 364 moved out of the range of movement of the abutment 325 so that the calculating machine comes to a standstill.

It is to be mentioned that during the output of the remainder toward the end of the movement of the main machine shaft 38, the abutment 332 of the slide 330 has already abutted of the flexible shaft 355 in view of its over-stroke and has displaced the same to the right to such extent that the rod 355 releases the lever 334, 335 so that slide 330 is locked at the edge 333 of the lever arm 334 in view of the tension of the spring 337. Slide 330, therefore, remains during the second revolution of the main machine shaft 38 in its switched-off position. With the last revolution of the main machine shaft 38 during the output of the quotient, also the program control shaft 118 reaches its 0 position and displaces the control rod 126 (FIG. 8) toward the right whereby the lever 215 moved up and down by the stud 212, is lifted into its right-hand basic position at the end of the revolution of the main machine shaft 38. In this way, also the decimal shaft 137 is brought back into its working position.

*Multiplication with and without pre-set fixed decimal point*

Prior to the starting of the multiplication operation, the decimal adjusting slide 181 (FIG. 8) is adjusted through the intervention of the adjusting knob 15 to the desired location of the decimal point. The adjustment of the knob 15 on mark 17 of scale 16 (FIG. 1) does not have any effect during the multiplication operation. In other words, the machine carries out a normal calculation without any decimal point.

By actuating the multiplication key 5 during a revolution of the main machine shaft 38, a value keyed into the numeral keyboard 1 is transferred as multiplicand into the stationary register 29 (FIGS. 2 and 3). The switching-on and switching-off of the motor 35 as well as the coupling (on and off) of the main machine shaft 38 is effected through the intervention of the control rod 258, the lever 255, 256, the lever 270, the shaft 269 (FIG. 8), the lever 274, the lever arms 276, 278 and the main machine coupling 37 (FIG. 10). Toward the end of the first revolution of the main machine shaft 38, the program control shaft 118 is brought into the control position II by means of the slide 105 (FIG. 5).

The subsequent input of the multiplier into the revolutions counter 32 (see FIGS. 2 and 3) is effected following actuation of the result key 7 in the same manner as described previously, during a further revolution of the main machine shaft 38, at the end of which revolution the program control shaft 118 is turned into the control position IV. In this control position IV the following operations are initiated. The control disc 123 pulls the control rod 126 (FIG. 8) toward the left and thus pulls the lever 215 beneath the slide 218 whereby at the end of the revolution of the main machine shaft 38, the decimal shaft 137 is tilted through the intervention of the bolt 212, the lever 215, the angle lever 150, 151 and the arresting latch 148. Thus, with a calculation involving a decimal point, the pins 144 are in their ineffective position, whereas with a calculation involving whole numbers, the arresting lever 315 (FIG. 6) is tilted through the intervention of the disc 319, and the register carriage 30 is released.

Simultaneously, control disc 130 on the program control shaft 118 releases the control rod 133 which at the end of the revolution of the main machine shaft 38 by means of the control disc 373 displaces itself toward the left and tilts the arresting lever 307 (FIG. 9) through the intervention of the pin 375 so that the carriage 30 is adapted to be moved toward the right during the calculating process.

Furthermore, the end 227 of slide 218 is moved into the range of movement of the carriage 30 through the intervention of the control disc 127 on program control shaft 118, the control link 129 and the lever 244, 245 (FIG. 8).

*Output of the product*

In order to switch on the main machine shaft 38 for the output of the product at the right time, the calculating machine according to the present invention is provided with the following devices. The outside of the right-hand wall 136 (see FIG. 8) is provided with a bolt 228 supporting a two-arm lever 229, 230 one arm 230 of which rests with an abutting edge 231 against a bolt 232 of a disc 233 mounted on main machine shaft 38. A lever 229, 230 is tilted in clockwise direction by means of a spring 234 engaging the lever arm 229, when during a rotation of the main machine shaft 38, the bolt 232 disengages the abutment edge 231. The upper lever arm 229 of the lever 229, 230 is provided with a bent extension 235 and normally moves beneath a follower edge 236 of a lever 237 which is hinged to a lever 240 connected to the shaft 239 at 238. Lever 237 is provided with a bolt 241 located in a recess 242 of the lever arm 244. Shaft 239 is rotatably mounted in the walls 135, 136. A lever arm 378 provided with a pin 377 is connected to the left-hand end of shaft 239 (see FIG. 10). Pin 377 slides in an oblong hole 379 of a two-arm lever 381 tiltably journalled on a bolt 380 of wall 135. The lower end of lever 381 is provided with an inclined control edge 382 which engages from underneath a pin 383 connected to the side of the lever arm 349.

During the tilting movement of the lever 244, 245 in clockwise direction, the lever 237 with its follower edge 236 is tilted through the intervention of the recess 242 and the bolt 241 into the range of movement of the protrusion 235. At the end of the rotation of the main machine shaft 38, the lever 229, 230 is brought back into its basic position shown in FIG. 8 while the extension 235 carries along the lever 237 through the intervention of the follower edge 236 and displaces the same in upward direction toward the left. In this way, the lever 240 and the shaft 239 are tilted in the direction of the arrow. As will be evident from FIG. 10, during the tilting movement of the shaft 239, the pin 377 slides in downward direction within the ablong hole 379 and tilts the lever 381 in clockwise direction while the control edge 382 thereof lifts the lever arm 349 through the intervention of the bolt 383 and releases the pin 348 on slide 330. The slide 330, therefore, during a multiplication operation is arrested by the edge 333 of the lever 334, 335 only.

Following the calculating process, the carriage returns into its right-hand end position as described before, and tilts the slide member 218 which slides off the lever 215 whereby the decimal shaft 137 is tilted in its working position through the intervention of the lever 150, 151 and the arresting latch 148. After the drive of the register carriage has been reversed so as to move the carriage toward the left, the register carriage 30 is by means of one of the pins 144 held in a position corresponding to the location of the decimal point for the proper output of the product. Together with the displacement of the decimal shaft 137 toward the left, the lever 334, 335 (see FIG. 10) is tilted in a clockwise direction through the intervention of disc 157 and the lever 159 and releases the extension 332 of the slide 330 which in turn releases the main machine coupling 37 through the intervention of the inclined edge 331, the pin 324 and the lever 323, 278 as described above.

Due to the displacement of the decimal shaft 137, the control latch 177 is through the intervention of the lever 141 (FIG. 6) and the control rod 172 tilted so as to engage the teeth 178 of disc 138, and the lever arm 80 of the carriage drive (see FIG. 4) is in view of the linkage 388 prevented from tilting in clockwise direction.

During a revolution of the main machine shaft 38, subsequently the output of the product is affected. Toward the end of the revolution of the main machine shaft 38 the drive spring 33 is through the intervention of the control disc 171 (FIG. 6), the linkage 388 and the lever 79, 80 (FIG. 4) in spite of the carriage 30 being arrested in a position corresponding to the location of the decimal point, completely tensioned and the carriage 30 is, through the intervention of the latch 177 (FIG. 6) released for a movement into its left-hand end position.

Simultaneously with the displacement of the program control shaft 118 into the O-position, the control rods 126 and 133 (FIG. 8) as well as the control linkage 129 are returned into their respective starting positions.

With a calculation involving whole numbers, the output of the product is effected in the same manner as described above. In this instance, however, the lever 334, 335 is merely tilted by the rod 355 of the register carriage 30 for purposes of releasing the slide 330 when the register carriage 30 has reached its left-hand end position in which the output of the product is effected.

*Summary*

FIG. 2 is a simplified diagrammatic representation of the device according to the present invention. The control operations prepared and/or initiated by the program control shaft in the particular example described in the preceding portion of the specification are directly caused by the main machine shaft and a positively controlled linkage, in a manner not shown.

The decimal shaft 137 tiltably journalled and displaceable in the walls 135, 136 is together with its pins 144 and discs 319, 138 as well as the pinion 147 resiliently held in its center position by the two levers 141, 140, the spring 142 and the stud 143, as described.

Decimal shaft 137 is provided with a radially extending pin 167′ required for the input of the dividend during a calculation with largest possible quotient. The adjustable abutments 145, 146 serving for the limitation of the axial movement of the decimal shaft 137 are provided within the walls 135, 136. The pinion 147 is engaged by the teeth 182 of the decimal adjusting slide 181 as well as the arresting latch 148. The lever 185 cooperating with the teeth 183 of the decimal adjusting slide 181, through the intervention of the roller 184 and acting upon the ball arresting means 189, 190 by means of the extension 188, is provided with an arm 191. After the input of a value into one of the registers 29, 31 or 32, a machine-actuated slide 391 is moved in the direction of the arrow against the thrust of a spring 392 in front of the arm 191 and thus arrests the slide 181 up to the output of the result. The respective adjusted position of the decimal adjusting slide 181 is indicated by means of the pointer 21′ on the scale 16′. By actuation of the division key 6 the switch 251 is closed through the intervention of an arm 393, and the motor 35 is switched on. An arm 394 provided on the division key 6 tilts a releasing member 395 hinged to the register carriage 30 into the position shown in FIG. 2 and the carriage-arresting member 307′ is tilted against the thrust of a spring 399 by means of a lever 398 guided in an oblong hole 396 of the stem 397. The carriage 30 moves toward the right until the dog 69 abuts one of the pins 144 or 167′ respectively in case a calculation with decimal numbers is carried out and in case the arresting member 315 is unlocked by the disc 319. In this way, the decimal shaft 137 is moved toward the right and a releasing latch 279′ is tilted through the intervention of a lever 400 and a linkage 401 whereby the main machine shaft 38 rotates for the input of the dividend. One spring each 403, 280 is provided at the levers 400 and 279′ for purposes of returning the same into their respective O-position. The input of the divisor is effected by actuating the result key 7 which, through the intervention of arm 405 actuates the switch 251 and thereby switches on the motor 35.

Simultaneously, a lever 407 hinged to a slide 406 is tilted against the thrust of a spring 408, which lever 407 tilts the lever 400 for a short period of time through the intervention of a cam 409 and thereby makes effective the coupling 37. Following the input of the divisor during a rotation of the main machine shaft 38, a lever 390 is tilted by the machine in the direction of the arrow and the latch 148 is moved in downward direction against the thrust of springs 412, 152 through the intervention of a lever 411 resting against an abutting edge 410 of the latch 148. In this way, the decimal shaft 137 is through the intervention of the pinion 147 turned into its ineffective position and releases the carriage 30 for a movement toward the right by means of the spring 33. In the righthand end position, an abutment 83′ of the carriage 30 engages an inclined edge 84′ of a tensioning slide 86 which rests against a fixed abutment 103′ with an arresting edge 102′ and releases the same by lifting so that the spring 34 becomes effective.

During the calculating process, the carriage is released in a stepwise manner until it reaches its left-hand end position while the lever 414 is tilted and the calculating shaft 41 is connected to the motor 35 by means of the coupling 40. Subsequently, in a manner not described during two further revolutions of the main machine shaft 38, the output of the remainder and the quotient, is effected. During the last revolution of the main machine shaft, the lever 390 and thereby the decimal shaft 137 is returned into its 0 position.

During a division with whole numbers, the release of the register carriage after the input of the divisor is effected by means of a lever 389 automatically controlled by the machine, which lever 389 lifts a linkage 416 displaceably mounted in the machine frame and engaging an oblong hole 419 of the lever 389, against the thrust of a spring 417 and thus unlocks the carriage arresting means 307.

During the input of a multiplicand by the mutliplication key 5, the motor 35 is switched on by means of an arm 418 and the main machine shaft 38 is coupled for one revolution in a manner not further described. An arm 419 tilts the releasing member 395 into its horizontal position. After the input of the multiplier by means of the result key 7, the decimal shaft 137 is turned through the intervention of the levers 390, 411 and the latch 148 and thereby the latch 315 is lifted, which latch during a calculation involving numbers without decimal point, is still in arresting engagement. Following the lifting of the second arresting latch 307 by means of the machine controlled lever 389, the spring 33 pulls the carriage 30 into the right-hand end position in a stepwise manner. During this movement, the abutment 395 laterally engages the arresting latch 148, the abutment edge 410 slides off the lever 411, and the spring 152 moves the decimal shaft 137 in working position through the intervention of the latch 148, so that the dog 69 of the carriage 30 abuts against one of the pins 144 during its leftward movement and displaces the decimal shaft 137 toward the left whereby the main machine coupling 37 is, through the intervention of a linkage 420 and the latch 279′ released for the output of the product with the decimal point at the proper place. In the meantime, also the levers 390 and 411 are returned to their starting positions and tilt the decimal shaft 137 after the output of the product once more, so that the carriage 30 may again return into its left-hand end position. A spring 413 engages the linkage 420 and returns the linkage into its starting position.

It is, of course, to be understood, that the present invention is, by no means, limited to the particular constructions shown in the drawings, but also comprises any modifications within the scope of the appended claims.

What is claimed is:

1. In a calculating machine having a frame, number keys, function keys, a main shaft, a stationary counter having a counter shaft, a reciprocable register carriage having a revolution counter and a main counter, a pin carriage to receive settings from said number keys, means for transferring settings from said pin carriage to said counters, and mechanism associated with said counters for performing calculating operations; an abutment element on said carriage, spring means for actuating said carriage, and means for stopping the carriage in preset decimal point positions comprising a decimal shaft adjacent the path of said abutment element and rotatable and axially movable in the frame and having abutment pins thereon axially spaced at the spacing of the number wheels of the main counter and arranged in a spiral path, centering means urging said decimal shaft toward a predetermined aixal position, first and second control linkage means connected in controlling relation to said mechanism and abutting the opposite ends of said decimal shaft for selective operation thereby in response to axial movement of said decimal shaft in respectively opposite directions as occasioned by engagement of an abutment pin by said abutment element, first means for positioning said decimal shaft angularly in effective position to dispose a selected abutment pin in the path of said abutment element, and second means for turning said decimal shaft angularly to ineffective position to dispose the abutment pins out of the path of said abutment element.

2. In a calculating machine according to claim 1 in which said means urging said decimal shaft toward a predetermined axial position comprising a disc on the decimal shaft, a pair of centering levers pivoted in the frame and engaging opposite sides of the disc, spring means acting on said centering levers to press them toward each other, and stationary abutment means for stopping the centering levers in their movement toward each other when said decimal shaft is in said predetermined axial position.

3. In a calculating machine according to claim 2, abutment means on said decimal shaft and said frame to limit the axial movement of the decimal shaft in both directions from said predetermined axial position thereof, movement of said decimal shaft in one direction from said predetermined axial position initiating the input of a dividend, movement of said decimal shaft in the opposite direction from said predetermined axial position initiating the output of a product, the said abutment means on said frame comprising side walls thereof in which said decimal shaft is journalled and the said abutment means on said decimal shaft comprising members adjustable thereon and engageable with the said side walls of said frame.

4. A calculating machine according to claim 3 in which said abutment means is adjusted to provide for axial movement of said decimal shaft in each direction an amount equal to half the diameter of an abutment pin plus half the dimension of said abutment element in the direction of movement thereof to provide for proper positioning of said carriage in the positions in which it is stopped by engagement of an abutment pin by said abutment element.

5. A calculating machine according to claim 4 in which the machine includes a drive motor, a single revolution clutch means connecting the drive motor with said main shaft, a control member for actuating said clutch, and said first and second control linkage means including means operatively connected to said control member for operation of said clutch in response to movement of said shaft in either direction from said predetermined axial position.

6. A calculating machine according to claim 5 in which said first and second means includes a toothed wheel on said shaft having the tooth spaces at angles equal to the angles between said abutment pins, and latch means engageable with said toothed wheel to hold said decimal shaft with an abutment pin in the path of said abutment element.

7. A calculating machine according to claim 5 in which said first and second means includes a toothed wheel on said decimal shaft having tooth spaces at angles equal to the angles between said abutment pins, latch means engageable with said toothed wheel to hold said shaft with an abutment pin in the path of said abutment element, a manually adjustable rack having teeth loosely engaging the tooth spaces of said toothed wheel, indicating means connected with said rack to indicate the position thereof, and adjusting mechanism for the decimal point printer of the machine also connected with said rack to be actuated thereby, the clearance of said teeth of the rack in said tooth spaces permitting said toothed wheel and decimal shaft to be turned by said latch means a sufficient distance to dispose the abutment pins on said decimal shaft out of the path of said abutment element.

8. A calculating machine according to claim 7 which includes a motion arresting device operatively associated with the function keys of said machine and with said rack and operable to prevent adjustment of said rack while a function key is depressed, a program control shaft for the machine rotatable during a calculating operation, and means connected between said rack and said control shaft operable for preventing adjustment of said rack during a calculating operation.

9. In a calculating machine having a frame, number keys, function keys, a main shaft, a stationary counter having a counter shaft, a reciprocable register carriage having a revolution counter and a main counter, a pin carriage to receive settings from said number keys, means for transferring settings from said pin carriage to said counters, and mechanism associated with said counters for performing calculating operations; an abutment element on said carriage, spring means for actuating said carriage, and means for stopping the carriage in preset decimal point positions comprising a decimal shaft adjacent the path of said abutment element and rotatable and axially movable in the frame and having abutment pins thereon axially spaced at the spacing of the number wheels of the main counter and arranged in a spiral path, centering means urging said decimal shaft toward a predetermined axial position, first and second control linkage means connected in controlling relation to said mechanism and abutting the opposite ends of said decimal shaft for selective operations thereby in response to axial movement of said decimal shaft in respectively opposite directions as occasioned by engagement of an abutment pin by said abutment element, first means for positioning said decimal shaft angularly in effective position to dispose a selected abutment pin in the path of said abutment element, and second means for turning said decimal shaft angularly to ineffective position to dispose the abutment pins out of the path of said abutment element, means for reciprocating said carriage comprising a pair of equally strong tension springs operatively connected to the carriage, a tensioning slide connected to one end of each tension spring, a tensioning rod operated in reciprocatory motion upon rotation of said main shaft during a calculating operation, and a bar having a connection to said tensioning slide and to said tensioning rod to move the tensioning slide in response to movement of said tensioning rod, one of said connections having lost motion equal to the travel of said tensioning rod.

10. A calculating machine according to claim 9 in which a first two arm pivoted lever is provided having one arm connected to said tensioning slide, a second two arm lever having one arm connected to the other end of one of said springs, an abutting connection between the other arm of said second lever and said one arm of said first lever, and an auxiliary tension spring connected between the said levers to hold said other arm of said second lever yieldably against said abutment.

11. A calculating machine according to claim 10 which includes stop means for abutting said second lever and operated into effective position during a calculating operation and in response to axial movement of said decimal shaft whereby movement of said carriage by said auxiliary spring is accomplished following output of the product in a pre-set position of the decimal point and while said second lever is held stationary by said stop means.

12. A calculating machine according to claim 11 which includes a cam on said main control shaft, a lever operated by the cam, a toothed disc on the decimal shaft, and a pawl connected to the said lever engageable with said toothed disc for turning said decimal shaft into position to dispose the abutment pins out of the path of said abutment element to thereby release said carriage after its return to its basic position following the output of a product.

13. In a calculating machine according to claim 8 in which the said disc on the decimal shaft is provided with teeth, and means operated by said machine during the calculating operation for engaging said teeth for turning said decimal shaft angularly at a predetermined time during a calculating operation to change the location of said abutment pins relative to said abutment element.

14. In a calculating machine according to claim 6 which includes a lever pivoted on said frame and pivotally connected to said latch means, a second lever operatively associated with said first mentioned lever, and means for operating said second lever in response to rotation of said main shaft for actuating the said first-mentioned lever to move said latch means to displace the decimal shaft angularly into ineffective position.

15. In a calculating machine according to claim 14 in which said latch means is in the form of a bar having a tooth on one side for engagement with the toothed wheel on the decimal shaft and having a step formed on the other side, a pin in the machine frame, said pin being so located that it will engage the said step and move the latch means toward the toothed wheel when the latch means is displaced in one direction.

16. In a calculating machine according to claim 1 which includes an indexable program control shaft for controlling division and multiplication operations, means for indexing said program control shaft in response to rotation of said main shaft near the end of the rotative movement of said main shaft, a two arm lever pivoted on said frame, cam means on the main shaft for tilting said lever, said second means including a toothed wheel on the decimal shaft and a latch member having a tooth engaging said toothed wheel, a second lever pivoted on the frame supporting said latch member and connected to said first lever, said first lever being movable by said main shaft thereby to move said second lever, a control rod connected to said second lever and operated by said program control shaft thereby to control said second lever thereby to control the movement of said latch member jointly in response to rotation of said main shaft and indexing movement of said program control shaft.

17. In a calculating machine according to claim 1 in which said second means includes a toothed wheel on said decimal shaft, a latch member having a tooth engaging said toothed wheel, a lever pivoted to the frame and pivotally connected with said latch member for movement of the latch member to turn the decimal shaft between effective and ineffective positions, a slide on said lever, said slide being positionable into or out of the range of movement of said carriage, another lever pivoted in the frame and engaging said slide for movement thereof and linkage means connected to said other lever for actuating the same, and indexable program control shaft in said machine having cam means thereon for actuating said linkage.

18. In a calculating machine according to claim 17 in which the said cam on the program control shaft is operable through the said linkage and levers to actuate said latch member to move said decimal shaft into its ineffective position at the end of two revolutions of said main shaft during the input of a multiplicand and multiplier into the machine, and a further cam on said program control shaft operable through said linkage and levers for moving said decimal shaft to ineffective position in response to actuation of the result key of the machine.

19. In a calculating machine according to claim 1 which includes a drive motor, a switch controlling the drive motor, a control rod controlling the switch, said control rod being moveable to close the switch in response to actuation of one of said function keys, a control shaft, a second lever on said control shaft having an abutting connection with said control rod and means operated by said another of said function keys for actuating said control rod for closing said switch.

20. In a calculating machine according to claim 1 which includes a drive motor for said main shaft, a switch for controlling the motor, a lever for controlling the switch, a control rod controlling said lever and operable in response to the actuation of a function key to cause closing of said switch, a control shaft, means for tensioning said control shaft in response to rotation of said main shaft, a second lever on said control shaft having an abutting connection with said first shaft, means for releasing said control shaft in response to the actuation of another function key following the rotation of the main shaft thereby again to close said switch, said first lever comprising an extension, a catch member on the first lever for holding said second lever in its ineffective position during the tensioning of said control shaft by said main shaft.

21. In a calculating machine according to claim 20 in which said catch includes a pin abutting the edge of said first lever for effecting engagement of said catch during return movement of said first lever following closing of said switch.

22. In a calculating machine according to claim 21 in which said control rod includes an abutment edge, a control lever engaging said abutment edge for holding said rod, and means operable upon movement of said decimal shaft for disengaging said control lever from said control rod to effect closing of said switch.

23. In a calculating machine according to claim 22 which includes an arresting lever pivoted to the frame for arresting said carriage in its one end position, means for moving said arresting lever in response to actuation of the function key controlling division, said arresting lever being operable for arresting the said carriage, and means operated by a function key for moving said arresting lever into ineffective position.

24. In a calculating machine according to claim 23 in which said decimal shaft comprises an abutment engageable with said control lever for holding the latter in ineffective position when said decimal shaft is adjusted for carrying out division operations without the use of a decimal point.

25. In a calculating machine according to claim 23 in which said program control shaft has a control cam thereon, a second control rod under the control of said control cam and operable for moving said arresting lever to ineffective position, another control cam on said main shaft and means on said control rod engaging said other control cam.

26. In a calculating machine according to claim 25 which includes a second arresting lever for arresting the said carriage, and means on said decimal shaft cooperating with said second arresting lever for moving the said arresting lever between effective and ineffective positions.

27. In a calculating machine according to claim 26 in which said decimal shaft has an additional abutment pin thereon moveable into effective position in one rotated position of said decimal shaft and operable during a division operation with a dividend input with the highest possble number of digits in the quotient.

28. In a calculating machine according to claim 26 in which said second control rod is spring urged in one direction and is prereleased by the said cam on said program control shaft during the input of a multiplier in the machine and is finally released by said main shaft during the final portion of rotation of said main shaft.

29. In a calculating machine according to claim 1 which includes a drive motor, a single rotation clutch operatively connected between the drive motor and said main shaft, a slide arranged in controlling relation with said clutch, and means for controlling said slide including lever means controlled by said carriage, and means controlled by said decimal shaft, and means controlled by said counter shaft.

30. In a calculating machine according to claim 1 which includes a drive motor, a single revolution clutch operatively connected between said drive motor and said main shaft, a lever controlling said clutch, a slide controlling said lever, a flexible releasing rod mounted on said carriage, an extension on said slide within the range of said rod, return movement of said slide affecting displacement of said rod, an arresting lever, and means for arresting said slide by said arresting lever.

31. In a calculating machine according to claim 30 in which said lever comprises a bent-off extension, a pivoted arm in the range of said bent-off extension, and means acting on said arm during the output of a remainder from the machine for holding said lever in its clutch releasing position.

32. In a calculating machine according to claim 31 in which a control member is provided connected with the said arm for moving the arm into its ineffective position, said control member being moveable during operation of the quotient calculating mechanism of said machine, whereby following the output of the quotient the said lever is operable for disengaging said clutch.

33. In a calculating machine according to claim 30 which includes a lever tiltable on said frame, a pin engaging an end of the control lever, a second lever supporting said pin and pivotally carried on said frame, and means operated by said program control shaft for actuating said first mentioned lever.

34. In a calculating machine according to claim 32 including a two arm lever tiltable on the machine frame, springs biasing said lever in one direction, an abutment curve on one arm of said lever, actuating means on the main shaft engaging said abutment curve, extension on the other arm of said lever, a control lever adapted for movement into range of movement of said extension, control disc means for moving said control lever and shaft means controlling said levers.

35. In a calculating machine having a register carriage with a main counter and a revolution counter carried thereby, spring means for reciprocating said carriage in its opposite directions of movement, means for interrupting movement of said carriage at predetermined positions in both directions of movement comprising an abutment element on the carriage, a decimal shaft adjacent the path of said abutment element and having abutment pins thereon arranged in a spiral path and axially spaced, means for angularly positioning said decimal shaft to dispose said abutment pins in or out of the path of said abutment element, said decimal shaft being axially yieldable, and means operated by axial movement of said decimal shaft for controlling the operation of said calculating machine.

References Cited by the Examiner

UNITED STATES PATENTS

| | | | |
|---|---|---|---|
| 2,917,232 | 12/1959 | Wagemann | 235—61 |
| 3,079,073 | 2/1963 | Heinze et al. | 235—61 |
| 3,143,289 | 8/1964 | Zanzenberger | 235—61 |
| 3,194,495 | 7/1965 | Gang | 235—61 |

LOUIS J. CAPOZI, *Primary Examiner.*

LEO SMILOW, *Examiner.*

TERRY J. ANDERSON, *Assistant Examiner.*